US012627111B2

(12) United States Patent　　　(10) Patent No.:　US 12,627,111 B2
Feugnet et al.　　　　　　　　　(45) Date of Patent:　　May 12, 2026

(54) METHOD FOR SERVOCONTROLLING AN OPTICAL DEVICE COMPRISING A LASER AND A CAVITY, MAKING IT POSSIBLE TO COMPENSATE FOR AN AMPLITUDE MODULATION INTRODUCED BY A PHASE MODULATOR

(71) Applicants: THALES, Courbevoie (FR); ECOLE NORMALE SUPERIEURE PARIS-SACLAY, Gif-sur-Yvette (FR); CENTRE NATIONAL DE LA RECHERCHE SCIENTIFIQUE, Paris (FR)

(72) Inventors: Gilles Feugnet, Palaiseau (FR); Maxime Descampeaux, Valence (FR); Fabien Bretenaker, Vélizy-villacoublay (FR)

(73) Assignees: THALES, Courbevoie (FR); ECOLE NORMALE SUPERIEURE PARIS-SACLAY, Gif-sur-Yvette (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 484 days.

(21) Appl. No.: 18/284,422

(22) PCT Filed: Apr. 1, 2022

(86) PCT No.: PCT/EP2022/058753
§ 371 (c)(1),
(2) Date: Sep. 27, 2023

(87) PCT Pub. No.: WO2022/207905
PCT Pub. Date: Oct. 6, 2022

(65) Prior Publication Data
US 2024/0120699 A1　　Apr. 11, 2024

(30) Foreign Application Priority Data
Apr. 1, 2021　(FR) ...................................... 2103389

(51) Int. Cl.
　*H01S 3/00*　　　(2006.01)
　*H01S 3/137*　　(2006.01)
　*H01S 3/139*　　(2006.01)

(52) U.S. Cl.
　CPC .......... *H01S 3/0085* (2013.01); *H01S 3/0078* (2013.01); *H01S 3/137* (2013.01); *H01S 3/1392* (2013.01)

(58) Field of Classification Search
　CPC ...... H01S 3/0085; H01S 3/0078; H01S 3/137; H01S 3/1392
　See application file for complete search history.

(56) References Cited

U.S. PATENT DOCUMENTS

| | | | |
|---|---|---|---|
| 5,068,864 A | 11/1991 | Javan | |
| 2019/0296519 A1* | 9/2019 | Kassi | G01N 21/39 |
| 2020/0014167 A1* | 1/2020 | Rolland | H01S 3/1307 |
| 2022/0026211 A1* | 1/2022 | Wu | G01C 19/721 |

OTHER PUBLICATIONS

Jin, et al., "Suppression of residual amplitude modulation of ADP electro-optical modulator in Pound-Drever-Hall laser frequency stabilization", Optics & Laser Technology, vol. 136, 106758, Apr. 2021.

(Continued)

*Primary Examiner* — Dennis P Joseph
(74) *Attorney, Agent, or Firm* — BakerHostetler

(57)　　　　　ABSTRACT

A method for the servo control of an optical device includes a cavity exhibiting resonance around a center frequency $f_c$, a laser and a phase modulator, the method being designed to servo-control the cavity to the laser or vice versa and to compensate for an amplitude modulation introduced by the phase modulator, the method comprising, inter alia, the following steps: A. varying a difference $\delta v$ between the optical frequency of the laser radiation and the center frequency, such that the optical frequency scans the resonance, the difference being controlled by a parameter of an element of the device, and for each difference $\delta v_i$ i. modulating, at a modulation frequency $f_{mod}$, a phase of the laser radiation, through a modulation phase $\phi_{mod}$, with the phase modulator, ii. injecting the phase-modulated radiation into the cavity, iii. using a photodiode to detect radiation reflected or transmitted by the cavity and generating an electrical (Continued)

signal (St, Sr) representative of the intensity of the detected radiation, iv. demodulating the electrical signal at the modulation frequency $f_{mod}$ by synchronously generating a first demodulated signal and a second demodulated signal representative of the demodulated electrical signal, respectively at a first demodulation phase $\phi_{dem,1}$ and at a second modulation phase $\phi_{dem,2}\phi_{dem,2}\approx\phi_{dem,1}$k, where k∈[0; 2π] is different from the first phase, and by filtering the first and the second signal so as to retain only a DC component of the first demodulated signal $V\epsilon_1$, called error signal 1, and of the second demodulated signal $V\epsilon_2$, called error signal 2.

10 Claims, 10 Drawing Sheets

(56) References Cited

OTHER PUBLICATIONS

Shi, et al., "Suppression of residual amplitude modulation effect in the Pound-Drever-Hall locking", arXiv. org, Cornell University Library, 2017.
Yu, et al., "Active cancellation of residual amplitude modulation in a frequency-modulation based Fabry-Perot interferometer", Review of Scientific Instruments, vol. 87, Issue 3, Mar. 2016.
Hall, et al., "Accurate removal of RAM from FM laser beams", 2015 Joint Conference of the IEEE International Frequency Control Symposium & the European Frequency and Time Forum, 2015.

* cited by examiner

METHOD FOR SERVOCONTROLLING AN OPTICAL DEVICE COMPRISING A LASER AND A CAVITY, MAKING IT POSSIBLE TO COMPENSATE FOR AN AMPLITUDE MODULATION INTRODUCED BY A PHASE MODULATOR

CROSS-REFERENCE TO RELATED APPLICATIONS

This application is a National Stage of International patent application PCT/EP2022/058753, filed on Apr. 1, 2022, which claims priority to foreign French patent application No. FR 2103389, filed on Apr. 1, 2021, the disclosures of which are incorporated by reference in their entireties.

FIELD OF THE INVENTION

The invention relates to the field of servo-controlling laser optical frequency to a resonant optical cavity or vice versa.

BACKGROUND

In many applications (gyrometer, gravitational interferometry or even metrology), it is necessary to have a laser source emitting radiation at a highly stable optical frequency. In order to improve the stability of the optical frequency of a laser, it is known to servo-control the laser to the resonance of a resonant optical cavity.

The method most commonly used to achieve such servo-control is that known as the Pound Dreyer Hall method, named after its inventors. FIG. 1 schematically shows a device for carrying out this method. The device comprises notably a cavity C exhibiting resonance around a center frequency $f_c$ and a laser L designed to generate a laser beam LL. The optical frequency of the laser beam is then shifted by an acousto-optic modulator AOM (optional component) to a frequency $f=\omega/2\pi$ within said resonance. The laser beam is then modulated, by a phase modulator PM, by a phase at a modulation frequency $$f_{mod} = \omega_{mod}/2\pi$$

and a modulation amplitude M. The modulation frequency is applied by a local oscillator OL.

Through a harmonic expansion, it may be shown that the phase-modulated beam injected into the cavity has an amplitude $E_{inj}$ such that:

$$E_{inj} = J_0(M)e^{i\omega t} + J_1(M)e^{i(\omega+\omega_{mod})t} - J_1(M)e^{i(\omega-\omega_{mod})t},$$

with J being Bessel functions, this equation being valid for low values of M by limiting the expansion to the first sidebands.

This equation makes it possible to observe that the phase modulator PM creates lateral frequency components, or sidebands, that are separated from the initial frequency $f$ by multiples of the modulation frequency $f_{mod}$, applied by the oscillator OL via PM. This modulation frequency is chosen, if possible, to be greater than the width of the resonance of the cavity, such that the sidebands are not at resonance with the cavity. Hereinafter, consideration is given only to the two sidebands at $f \pm f_{mod}$.

The laser beam is then injected into the cavity C. Said cavity has a reflection-mode transfer function, denoted $F_r$, that links the amplitude of the incident electric field and that of the reflected electric field. An optical circulator CO (typically based on a Faraday rotator positioned between two polarization splitter cubes) directs the laser beam reflected by the cavity onto a photodiode, denoted PDr. The signal SI generated by the photodiode is then demodulated by a demodulation system Demo comprising a mixer $Mix_0$ that multiplies the signal SI by the modulation signal applied to PM with a demodulation phase. A low-pass filter $LP_0$ then makes it possible to keep only the DC component of the demodulated signal, the amplitude of which, $V\varepsilon$, called error signal, is then proportional to the difference between the frequency $f$ of the laser and the resonant frequency $f_c$ of the cavity. Indeed, the amplitude of the error signal is:

$$V\varepsilon = 2G\sqrt{P_cP_s}\, \mathrm{Im}\!\left[F_r(\omega)\cdot\overline{F_r(\omega+\omega_{mod})} - \overline{F_r(\omega)}\cdot F_r(\omega+\omega_{mod})\right],$$

where $P_c$ and $P_s$ are the power of the fundamental and sideband component, respectively, and G is the conversion gain between the optical power received and the voltage delivered by the photodiode.

When the modulation frequency is high enough and when a difference $\delta\nu$ between frequency of the laser radiation and the center frequency of the resonance is small enough, it may then be shown that:

$$V\varepsilon = G\frac{8\sqrt{P_cP_s}}{\Delta f_c}\delta\nu,$$

where $\Delta f_c$ is the linewidth of the resonance (for a high-finesse Fabry-Pérot cavity).

When the frequency $f$ of the laser and the resonant frequency of the cavity deviate slightly, the two sidebands are unchanged (if they are indeed out of resonance), whereas the phase and the amplitude of the beam at the frequency $f$ change (since it is no longer at resonance). The properties of coherence between the three spectral components of the laser beam then make it possible to measure these fluctuations that result in this linear variation of the demodulated signal, which may thus be used as a frequency error signal, $V\varepsilon$ being canceled out when the laser radiation is resonant with a mode of the cavity.

A processor UT is then configured to carry out servo control with this error signal $V\varepsilon$, via feedback electronics, using conventional servo control methods, for example, without being restrictive, with PI or PID (proportional integral derivative) feedback electronics, alluding to the three modes of action on the error signal of the feedback electronics. This type of feedback for making the error signal converge toward a zero value is well known in automation.

With regard to the choice of the modulation frequency to be applied to PM, if the finesse of the cavity is great, the width of the resonances of the cavity will be small compared to the free spectral range and the modulation frequency may be chosen to be very large compared to the frequency width of the resonance peaks of the cavity. This will then be the optimum situation, corresponding to the above explanation, for this servo control. On the other hand, if the finesse of the cavity is not very great, the modulation frequency will be close to the frequency width of the resonance peaks of the cavity. The sidebands are then partially modified when the frequency $f$ deviates from the resonance and the servo control is less effective.

The servo loop retroacts on the laser, for example via the DC voltage supplied to the laser (in the case of a semiconductor laser, for example) so as to maintain or preserve the frequency of the laser $f$ at a resonant frequency of the cavity. As an alternative, the servo control is carried out to the length of the cavity, the frequency of the laser remaining fixed. More precisely, the device comprises a piezoelectric translation stage (not shown in FIG. 1) to which one of the mirrors of the cavity is fixed, for example, so as to control a length of the cavity or else to extend or contract part of the cavity if it is a fiber cavity. A final option consists in carrying out the servo control to the AOM via the excitation frequency of the AOM.

This technique works perfectly in theory. However, in practice, it suffers from a major drawback. Indeed, most phase modulators are based on electro-optical crystals (for example those made of lithium niobate) and introduce an amplitude modulation associated with the phase modulation (residual amplitude modulation, RAM). Indeed, since the medium that is used is birefringent, this modulation is due to the fact that the incident polarization of the laser radiation is not perfectly aligned with the crystal axis that is used. At the output of the modulator, the electric field comprises two components related to the magnitude of the projection of the incident electric field onto the two axes of the crystal. Moreover, it is common, at the output of the phase modulator, for a more or less perfect polarizer to be included on the path (because a coupler or an isolator or else a circulator is inserted behind the phase modulator or else because the polarization state has to be well defined for needs relating to the experiment, and then a polarizer is introduced). After projection onto the passing direction of the polarizer, the mixing of these two components induces an amplitude modulation associated with the phase modulation.

The problem is that these two phase and amplitude modulations are at the same frequency $f_{mod}$. The demodulation process explained above therefore does not make it possible to separate them, and the amplitude modulation results in a bias on the error signal. When this error signal is used by a servo control system, this bias results in locking of the laser next to the resonance of the cavity or the absorption peak. Moreover, this bias may vary since it is temperature-sensitive, since it depends on the natural birefringence of the crystal.

In order to correct the RAM, the most conventional method consists, at the output of the phase modulator PM, in sampling, using a splitter plate LSP, part of the phase-modulated laser beam LL and in detecting same using a photodiode $PD_{ram}$, called RAM control photodiode (see FIG. 1). By demodulating at the modulation frequency, it is then possible to generate a signal proportional to the induced bias. This signal is used to counter-react on the crystal via the processor UT by applying thereto, in addition to the modulation voltage, a DC voltage or a voltage that varies slowly as a function of the fluctuations of the bias. This DC voltage creates a birefringence that opposes the natural birefringence of the crystal. The bias is thus correctly canceled out on this photodiode $PD_{ram}$.

The major drawback of this approach is that this photodiode $PD_{ram}$ is not the photodiode $PD_r$ that makes it possible to servo-control the laser L to the cavity C. However, if the assembly comprises other birefringent components (optical fibers, circulators, couplers, etc.) after the phase modulator PM, canceling out the modulation amplitude on the photodiode $PD_{ram}$ does not guarantee that it is canceled out on the photodiode $PD_r$.

FIG. 2 illustrates this problem in more detail in a non-limiting example. In this figure, the device comprises a polarizer Pol at input before the phase modulator PM, which is followed by a 1×2 coupler coupled to two polarization-maintaining fibers. One fiber is redirected toward PDram (not shown in FIG. 2) and the other fiber FMP is redirected toward the cavity C through the circulator CO comprising a polarizer. The polarizer of the CO makes it possible for example to set the polarization state of the field incident on the cavity well in order to avoid introducing biases or instability due to the deformation of the resonances caused by the excitation of wrong polarization. The field leaving the phase modulator is written (ordinary axis along y and extraordinary axis along z):

$$\overrightarrow{E_{PM}} = E_0 e^{i\omega t}\left(e^{i\phi_3}\cos\beta\vec{z} + e^{i\phi_2}\sin\beta\vec{y}\right), \text{ where}$$

$$\phi_{2,3} = \phi_{o,e} + \phi_{o,e}^{dc} + \delta_{o,e}\sin\omega_{mod}t$$

is the phase applied by the phase modulator $$\phi_{o,e} + \phi_{o,e}^{DC} = \frac{2\pi l}{\lambda}n_{o,e} - \frac{\pi l}{\lambda d}r_{o,e}n_{o,e}^3 V_{DC},$$

where $n_{o,e}$ are the indices along the ordinary and extraordinary axes, respectively, and $V_{DC}$ is the DC voltage applied to the phase modulator $$\delta_{o,e} = -\frac{\pi l}{\lambda d}r_{o,e}n_{o,e}^3 V_{RF},$$

where l, d are the dimensions of the phase modulator and $V_{RF}$ is the AC voltage applied to the phase modulator and $$f_{mod} = \omega_{mod}/2\pi$$

is the modulation frequency.

It will be recalled that, for Pound-Drever-Hall servo control, the optimum modulation depth $M=\delta_e$ is around 1 rad and, taking into account the values of $n_o=2.2108$, $n_e=2.1373$, $r_o=8.6$ pm/V, $r_e=30.8$ pm/V, this gives $$\delta_o = \delta_e \frac{r_o n_o^3}{r_e n_e^3} \approx 0.3$$

Let $\beta'$ be the angle between the axis z of the crystal of the phase modulator and the axis z' of the fiber FMP, such that:

$$\vec{z} = \cos\beta'\vec{z'} + \sin\beta'\vec{y'}$$

$$\vec{y} = -\sin\beta'\vec{z'} + \cos\beta'\vec{y'}$$

-continued $$\overrightarrow{E_{PM}} =$$

$$E_0 e^{i\omega t}\left(e^{i\phi_3}\cos\beta\left(\cos\beta'\overrightarrow{z'} + \sin\beta'\overrightarrow{y'}\right) + e^{i\phi_2}\sin\beta\left(-\sin\beta'\overrightarrow{z'} + \cos\beta'\overrightarrow{y'}\right)\right) =$$

$$E_0 e^{i\omega t}\left(e^{i\phi_3}\cos\beta\cos\beta' - \sin\beta\sin\beta' e^{i\phi_2}\right)\overrightarrow{z'} +$$

$$\left(e^{i\phi_3}\cos\beta\sin\beta' + e^{i\phi_2}\sin\beta\cos\beta'\right)\overrightarrow{y'}$$

After passing through the fiber FMP, characterized by its index $n_{slow}$ along the axis z and $n_{fast}$ along the axis y:

$$\overrightarrow{E_{FMP}} =$$

$$E_0 e^{i\omega t}\left[\left(e^{i\phi_3}\cos\beta\cos\beta' - \sin\beta\sin\beta' e^{i\phi_2}\right)e^{i\phi_s}\overrightarrow{z'} + \left(e^{i\phi_3}\cos\beta\sin\beta' + e^{i\phi_2}\sin\beta\cos\beta'\right)e^{i\phi_f}\overrightarrow{y'}\right],$$

where $\phi_{f,s}$ is the phase shift induced by the fiber FMP along the axis y and z, respectively, then, after the polarizer of the CO oriented at $\gamma'$ from the axis z', the field $E_{co}$ is written:

$$\overrightarrow{E_{CO}} =$$

$$E_0 e^{i\omega t} e^{i\frac{\phi_s+\phi_f}{2}}\left[\left(e^{i\phi_3}\cos\beta\cos\beta' - \sin\beta\sin\beta' e^{i\phi_2}\right)e^{i\frac{\phi_s-\phi_f}{2}}\cos\gamma' + \left(e^{i\phi_3}\cos\beta\sin\beta' + e^{i\phi_2}\sin\beta\cos\beta'\right)e^{-i\frac{\phi_s-\phi_f}{2}}\sin\gamma'\right]\overrightarrow{y'}$$

by writing $$\Delta\phi' = \frac{\phi_s - \phi_f}{2} =$$

$$E_0 e^{i\omega t} e^{i\frac{\phi_s+\phi_f}{2}}\left[e^{i\phi_3}\cos\beta\left(\cos\beta'\cos\gamma' e^{i\frac{\Delta\phi'}{2}} + \sin\beta'\sin\gamma' e^{-i\frac{\Delta\phi'}{2}}\right) + e^{i\phi_2}\sin\beta\left(-\sin\beta'\cos\gamma' e^{i\frac{\Delta\phi'}{2}} + \cos\beta'\sin\gamma' e^{-i\frac{\Delta\phi'}{2}}\right)\right]\overrightarrow{y'}$$

$$\overrightarrow{E_{CO}} = E_0 e^{i\omega t} e^{i\frac{\phi_s+\phi_f}{2}}[b' e^{i\phi_3} + a' e^{i\phi_2}]\overrightarrow{y'} = E_0 e^{i\omega t} e^{i\frac{\phi_s+\phi_f}{2}}\left[|b'|e^{i(\phi_3+\phi_{b'})} + |a'|e^{i(\phi_2+\phi_{a'})}\right]\overrightarrow{y'} \qquad \text{Equation 1}$$

by introducing $$b' = \cos\beta\left(\cos\beta'\cos\gamma' e^{i\frac{\Delta\phi'}{2}} + \sin\beta'\sin\gamma' e^{-i\frac{\Delta\phi'}{2}}\right) = |b'|e^{i\phi_{b'}}$$

$$a' = \sin\beta\left(-\sin\beta'\cos\gamma' e^{i\frac{\Delta\phi'}{2}} + \cos\beta'\sin\gamma' e^{-i\frac{\Delta\phi'}{2}}\right) = |a'|e^{i\phi_{a'}}$$

The intensity on the RAM control photodiode is then:

$$I_T = E_{CO} \cdot \overline{E_{CO}} = |E_0|^2\left(|a'|^2 + |b'|^2 + 2|b'||a'|\cos((\phi_3 - \phi_2) + \phi_{b'} - \phi_{a'})\right)$$

with $$\phi_3 - \phi_2 =$$

$$\frac{2\pi l}{\lambda}(n_0 - n_e) - \frac{\pi l}{\lambda d}\left(r_o n_o^3 - r_e n_e^3\right)V_{DC} - \frac{\pi l}{\lambda d}\left(r_o n_o^3 - r_e n_e^3\right)V_{RF} \cdot \sin(\omega_{mod}t)$$

By writing:

$$\Delta\phi + \Delta\phi^{DC} = \phi_o - \phi_e + \phi_o^{DC} - \phi_e^{DC} = \frac{2\pi l}{\lambda}(n_0 - n_e) - \frac{\pi l}{\lambda d}\left(r_o n_o^3 - r_e n_e^3\right)V_{DC}$$

Through harmonic decomposition, and then by selecting the first harmonic and by demodulating the signal generated by the system Dem at $\omega_{mod}$, with a demodulation phase chosen to be zero, this gives a RAM error signal VRAM to be canceled out, having the value:

$$V_{RAM} = -2|a'||b'||E_0|^2 J_1(M)\sin\left(\Delta\phi + \Delta\phi^{dc} + \phi_{b'} - \phi_{a'}\right),$$

where $J_1$ is the 1st-order Bessel function.

Thus, the DC voltage $V_{DC}$ to be applied to the phase modulator modifies $\Delta\phi^{dc}$ and has to correct both the birefringence of the crystal and that of the fiber $$(\phi_{b'} - \phi_{a'}) \text{ so that } v_{RAM} = 0,$$

that is to say $$\sin\left(\Delta\phi + \Delta\phi^{dc} + \phi_{b'} - \phi_{a'}\right) = \sin(\Delta\phi_{RAM}) = (2k+1)\pi/2.$$

7

8

This is possible, of course, because the correction is modulo $2\pi$, but the problem is that the part of the beam that propagates in the other fiber of the coupler toward the cavity will undergo other fluctuations. The correction on the RAM control photodiode therefore does not enable the correction on the other beam. This analysis may be performed in other cases, for example if a polarizer is present between the phase modulator and the optical fiber. They lead to the same condition $$\sin\!\left(\Delta\phi + \Delta\phi^{dc} + \phi_{b'} - \phi_{a'}\right) = k\pi$$

with a definition of $$\phi_{b'} - \phi_{a'}$$

that depends on the assembly. The conclusion is thus identical: canceling out on one arm of the assembly does not guarantee canceling out on another arm, except possibly in free-space mode in the absence of polarizing elements. Another limitation common to a free-space or fiber assembly in which one photodiode is dedicated to controlling the RAM and another is dedicated to the locking of the laser and the cavity is the demodulation phase. Indeed, in order to best benefit from the canceling out of the RAM, the demodulation phase used to generate the error signal that serves to lock the laser must be the same as that used to cancel out the RAM on the RAM control photodiode. If this is not the case, the demodulation process gives rise to a component related to the RAM. In practice, it is not easy to guarantee this phase equality. Indeed, the demodulation phases, which are adjusted to synchronous detections, correct the delays caused by the electronics (photodiode output amplifier, propagation in the cables, in synchronous detection, etc.), and these phases may drift.

SUMMARY OF THE INVENTION

The invention aims to overcome some of the abovementioned problems of the prior art. More specifically, the invention relates to a method for correcting the RAM on the same photodiode as that used to servo-control the laser optical frequency to the resonance of the cavity. This method therefore makes it possible to overcome an error introduced by the birefringence of the components introduced after the phase modulator.

To this end, one subject of the invention is a method for the servo control of an optical device comprising a cavity exhibiting resonance around a center frequency $f_c$, a laser and a phase modulator, said method being designed to servo-control said cavity to said laser or vice versa and to compensate for an amplitude modulation introduced by said phase modulator, said method comprising the following steps:

Using said laser to generate laser radiation at an optical frequency $f$ within said resonance, Varying a difference $\delta\nu$ between said optical frequency of said laser radiation and said center frequency, such that said optical frequency scans said resonance, said difference being controlled by a parameter of an element of said device, and for each difference $\delta\nu_i$:

Modulating, at a modulation frequency $f_{mod}$, a phase of said laser radiation, through a modulation phase $\phi_{mod}$, with the phase modulator, Injecting the phase-modulated radiation into said cavity, Using a photodiode to detect radiation reflected or transmitted by said cavity and generating an electrical signal representative of the intensity of said detected radiation, Demodulating said electrical signal at said modulation frequency $f_{mod}$ by synchronously generating a first demodulated signal and a second demodulated signal representative of the demodulated electrical signal, respectively at a first demodulation phase $\phi_{dem,1}$ and at a second modulation phase $$\phi_{dem,2} \quad \phi_{dem,2} \approx \phi_{dem,1}k, \text{ where } k \in [0; 2\pi]$$

is different from said first phase, and by filtering the first and the second signal so as to retain only a DC component of the first demodulated signal $V\epsilon_1$, called error signal 1, and of the second demodulated signal $V\epsilon_2$, called error signal 2, C. Computing a function 1 $f_2$ and a function 2 $f_2$ respectively representing a change in the error signal 1 and a change in the error signal 2 as a function of said difference for a given value of said first demodulation phase, D. Repeating steps B) and C) by varying said first demodulation phase between each repetition until, for a value of the first demodulation phase, called decoupling phase $$\phi_{dem,1} = \phi_{dec},$$

said function 1 or said function 2 has a plateau on a portion of values of said difference comprising 0, said function out of 1 or 2 having the plateau being called PL function, the function not having the plateau being called SP function;

E. At said decoupling phase, varying said difference so as to observe an extremum, for what is called a zero difference, said intensity of the light radiation detected by said photodiode, and servo-controlling said element to a value of said parameter that makes it possible to maintain this intensity extremum, F. At said decoupling phase, modulating the phase of said laser radiation, with the phase modulator (PM), using what is called an additional periodic signal at what is called an additional modulation frequency $f_{add}$ in addition to that at said modulation frequency $f_{mod}$;

G. Minimizing, for the SP function, an amplitude of a first harmonic of the additional signal, by varying said first demodulation phase, this minimum being reached for what is called a first additional demodulation phase $$\phi_{dem,1} = \phi_{dec2},$$

and, at said additional phase, servo-controlling said element to a value of said parameter that makes it possible to maintain this intensity extremum, H. At said decoupling phase $$\phi_{dem,1} = \phi_{dec}$$

and at said zero difference, varying said first modulation phase until the PL function is canceled out, and maintaining the canceling out of said PL function by servo-controlling said phase modulator.

According to one particular embodiment of the method of the invention, step H) consists in varying a voltage $V_{dc,pm}$ of said phase modulator up to what is called a RAM voltage value that makes it possible to cancel out the PL function and servo-controlling said phase modulator to said RAM voltage.

According to another particular embodiment of the method of the invention that is compatible with the previous embodiment, in step iii), said photodiode detects the radiation transmitted by said cavity and said method comprises a step D1), after step D) and before step E), consisting in varying said modulation frequency until a slope of said SP function is at a maximum on said portion of values, by repeating step D for each modulation frequency.

According to another particular embodiment of the method of the invention that is compatible with the previous two embodiments, the additional frequency $f_{add}$ is 10 times lower than the modulation frequency $f_{mod}$.

Another subject of the invention is an optical device comprising a cavity exhibiting resonance around a center frequency $f_c$ and a laser designed to generate laser radiation at an optical frequency $f$ within said resonance, said device comprising:

an element designed to vary a difference $\delta v$ between said optical frequency of said laser radiation and said center frequency, such that said optical frequency scans said resonance, said difference being controlled by a parameter of said element, a phase modulator configured to modulate, at a modulation frequency $f_{mod}$, a phase of said laser radiation, through a modulation phase $\phi_{mod}$, and designed to vary said modulation phase, the phase-modulated radiation being injected into said cavity, a photodiode designed to detect radiation transmitted or reflected by said cavity and configured to generate an electrical signal representative of the intensity of said detected radiation, a demodulation system designed to demodulate said electrical signal at said modulation frequency $f_{mod}$, for each difference $\delta v_i$, by:

synchronously generating a first demodulated signal and a second demodulated signal representative of the demodulated electrical signal, respectively at a first demodulation phase $\phi_{dem,1}$ and at a second modulation phase $\phi_{dem,2}$ different from said first demodulation phase, such that $$\phi_{dem,2} \approx \phi_{dem,1} \pm k, \text{ with } k \in [0; 2\pi],$$

filtering the first and the second signal so as to retain only a DC component of the first demodulated signal, called error signal 1 $V_{\epsilon_1}$, and of the second demodulated signal, called error signal 2 $V_{\epsilon_2}$, a processor connected to the modulation system and designed to:

compute a function 1 and a function 2 respectively representing a change in the error signal 1 and a change in the error signal 2 as a function of said difference $\delta v$ for a given value of said first demodulation phase, determine a value of the first demodulation phase, called decoupling phase $$\phi_{dem,1} = \phi_{dec},$$

for which said function 1 or said function 2 has a plateau on a portion of values of said difference comprising 0, said function out of X or Y having the plateau being called PL function, the function not having the plateau being called SP function, determine, at said decoupling phase, a difference, called zero difference, for which said intensity of the light radiation detected by said photodiode reaches an extremum, and servo-control said element to a value of said parameter that makes it possible to maintain this intensity extremum, modulate, at said decoupling phase, the phase of said laser radiation, with the phase modulator, using what is called an additional periodic signal at what is called an additional modulation frequency $f_{add}$ in addition to that at said modulation frequency $f_{mod}$;

minimize, for the SP function, an amplitude of a first harmonic of the additional signal, by varying said second demodulation phase, this minimum being reached for what is called a second additional demodulation phase, and servo-control said element to a value of said parameter that makes it possible to maintain this intensity extremum at said additional phase, determine, at said decoupling phase and at said zero difference, a value of said modulation phase for which said PL function is canceled out, and servo-control said phase modulator in order to maintain the canceling out of said PL function.

According to one particular embodiment of the device of the invention, the element is said laser and said parameter is a DC voltage $V_{dc,L}$ supplied to the laser.

According to another particular embodiment of the device of the invention, the element is an acousto-optic modulator configured to vary said optical frequency of the laser radiation before it is phase-modulated by said phase modulator, said parameter being an excitation frequency $f_{AOM}$ of said acousto-optic modulator.

According to another particular embodiment of the device of the invention, the element is a piezoelectric translation stage to which a component of said cavity is fixed, said stage being designed to vary a length of the cavity, said parameter being said length of the cavity.

According to one particular embodiment of the device of the invention that is compatible with all of the embodiments of the invention, the cavity is a ring cavity comprising an optical fiber and first and second coupling means configured to couple said radiation injected into said cavity with said optical fiber, the first and second coupling means comprising a mirror or a fiber coupler.

According to one variant of the above particular embodiment of the device of the invention, the device comprises:

an optical splitter designed to split the laser radiation into a first and a second optical channel so as to inject said laser radiation into the cavity in a first and a second direction, the first optical channel comprises the phase modulator and an optical circulator positioned after the phase modulator, the second optical channel comprises an additional phase modulator, and an additional optical circulator positioned after the additional phase modulator, said optical circulator and said additional optical circulator being designed to direct the laser radiation injected respectively in said second direction and in said first direction and then reflected by the cavity toward an additional reflection photodiode and toward said photodiode, a first optical path of said first optical channel and a second optical path of said second optical channel between the phase modulator and said cavity, and the additional phase modulator and said cavity, respectively, having a guided-optic configuration.

BRIEF DESCRIPTION OF THE DRAWINGS

Other features, details and advantages of the invention will become apparent on reading the description given with reference to the appended drawings, which are given by way of example and in which, respectively.

-continued $$\sum_{k=0}^{p} - \mathrm{Re}(b_k)\sin(\varphi_{dem}) + \mathrm{Im}(b_k)\cos(\phi_{dem}) \text{ as a function of } \Delta\phi,$$

Figure 13A:
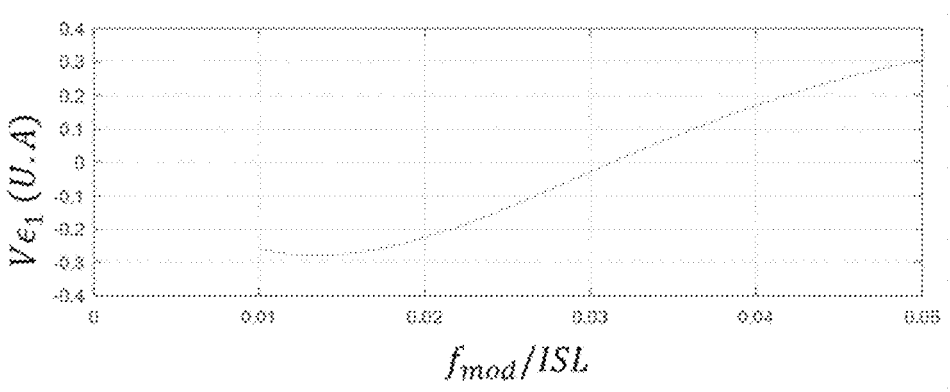
Figure 13B:
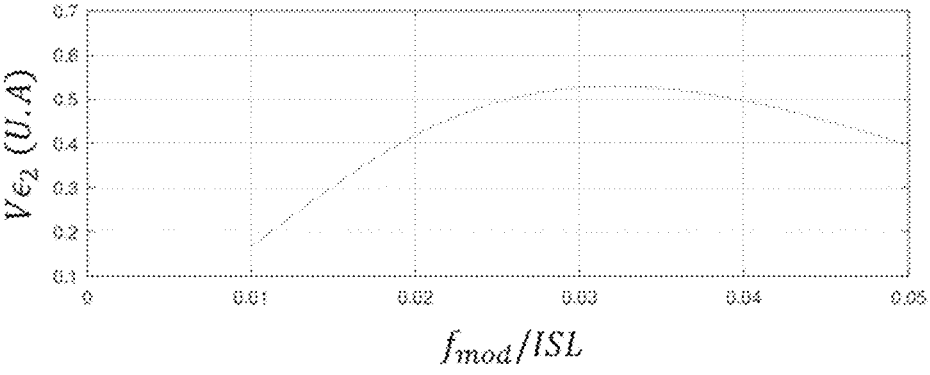

FIGS. 13A and 13B show a change in $$V_{\varepsilon_x} = \sum_{k=0}^{p} \mathrm{Re}(A_k)\mathrm{Re}(K_k) \text{ and } V_{\varepsilon_y} = \sum_{k=0}^{p} \mathrm{Re}(A_k)\mathrm{Im}(K_k)$$

as a function of $f_{mod}/ISL$.

References to the figures, when they are identical, correspond to the same elements.

In the figures, the elements are not to scale unless indicated otherwise.

DETAILED DESCRIPTION

Figure 3A:
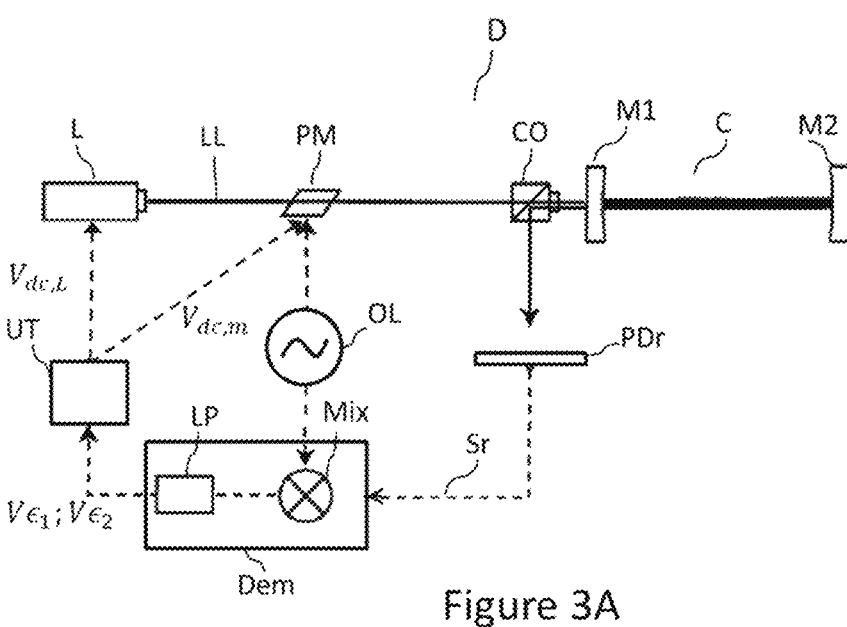
FIGS. 3A and 3B show a schematic view of an optical device according to the invention for servo-controlling a laser to a laser cavity.
Figure 3B:
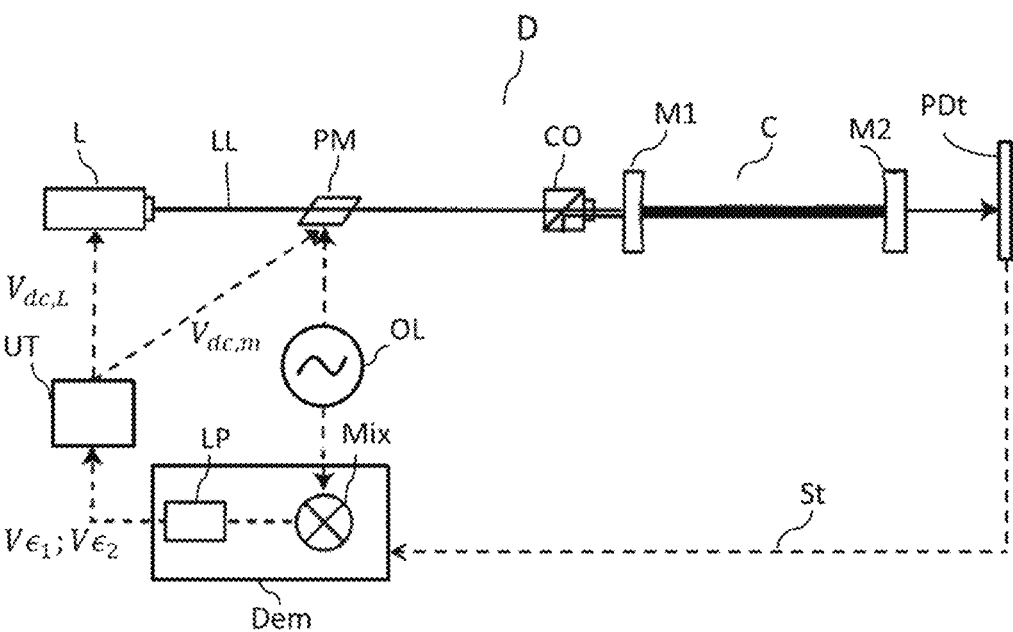

FIGS. 3A and 3B illustrate a schematic view of an optical device D according to the invention for servo-controlling a laser L to a laser cavity C (a linear cavity in the figure, but it may also be a ring cavity) while correcting the RAM introduced by a phase modulator PM. FIG. 3A illustrates a first variant in which the servo control and the RAM correction are carried out using a photodiode $PD_r$ that detects the radiation reflected by the cavity. FIG. 3B illustrates a second variant in which the servo control and the RAM correction are carried out using a photodiode $PD_t$ that detects the radiation transmitted by this cavity. This device is intended to implement the servo control method described in FIGS. 4 and 7, which will be described in detail later.

Figure 1:
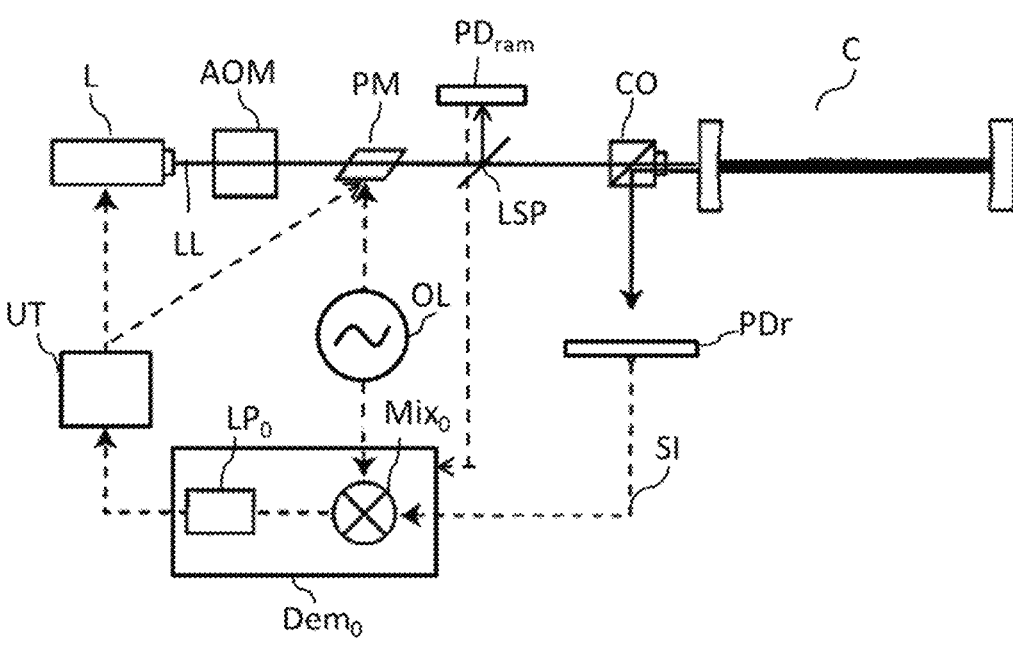
FIG. 1 shows a schematic view of a device for the servo control of a laser to a cavity from the prior art.

In structural terms, the device D is similar to that of the prior art shown in FIG. 1, with one major exception, which lies in the fact that the RAM is corrected on a photodiode PDr or PDt, detecting radiation reflected or transmitted by the cavity C, which is the same as the one used to servo-control the laser to the resonance of the cavity. The device and the associated method thus make it possible to compensate for the RAM without the birefringence of the components positioned after the phase modulator introducing errors in the correction of the RAM and in the servo control of the laser to the cavity. For greater clarity, the equations demonstrating that it is possible both to servo-control the laser to the cavity and to control the RAM so that it does not introduce biases are given in the appendix. It is also shown in this section that it is possible to decouple the servo control of the laser and that of the phase modulator PM in order to cancel out the RAM using error signals generated based on a single photodiode PDr (FIG. 3A) or PDt (FIG. 3B).

In the device D, the laser L generates a laser beam LL at an optical frequency $f$ within a resonance of the cavity C. This laser beam LL then passes through the phase modulator PM. The phase modulator applies, to the laser beam LL, a phase $\phi_{mod}$ that is modulated at a frequency $$f_{mod} = \omega_{mod}/2\pi.$$

As seen above, the phase modulator applies a phase $$\phi_{mod} = \phi_{o,e} + \phi_{o,e}^{ac} + \delta_{o,e}\sin \omega_{mod}t$$

along the ordinary axis "o" and the extraordinary axis "e".

Moreover, since $$\phi_{o,e} + \phi_{o,e}^{DC} = \frac{2\pi l}{\lambda} n_{o,e} - \frac{\pi l}{\lambda d} r_{o,e} n_{o,e}^3 V_{DC},$$

it is possible to vary the modulation phase $\phi_{mod}$ by varying the DC voltage applied to the phase modulator.

The modulation frequency $f_{mod}$ is applied by a local oscillator OL. The modulation depth $M = \delta_e$ may adopt any value but, in an assembly such as described above, it is typically equal to 1.1 rad. As an alternative, according to another embodiment, the modulation depth is equal to 2.45 rad. The choice of a greater modulation depth makes it possible to eliminate the optical carrier. It is used in certain ring cavity configurations to address the problem related to backscatter in the cavity. For example, a resonant passive gyroscope consists of an optical cavity probed by two counter-propagating beams. Under the effect of rotation, the resonant frequencies will be modified differently (Sagnac effect) unless the backscatter is so strong that it frequency-locks the two optical carriers, then preventing any measurement of speed. One solution then consists in adapting the gyroscope to make it operate while eliminating the optical carriers.

Moreover, in all of the embodiments of the invention, D comprises an element designed to vary a difference $\delta v$ between the optical frequency of the laser radiation LL and the center frequency $f_c$, this difference being controlled by a parameter of the element. This element thus makes it possible to servo-control the resonance of the cavity to the optical frequency of the laser or vice versa. More precisely, the element must be designed such that the optical frequency $f$ scans the resonance. In the embodiment of FIGS. 3A and 3B, it is the laser itself that is designed to vary $\delta v$, by way of the DC voltage $V_{dc,l}$ supplied to the laser L. As an alternative, in the embodiment of FIGS. 8 and 9, it is the acousto-optic modulator AOM and a piezoelectric translation stage TS to which a component of the cavity is fixed, respectively, that are the element for varying the difference $\delta v$.

After having passed through the phase modulator PM, the phase-modulated laser beam passes through an optical circulator CO, which may comprise a polarizer (not shown in FIGS. 3A and 3B) in order to set the polarization state of the field incident on the cavity (or else the polarizer may be positioned between the circulator and the cavity). The presence of a polarizer before the cavity makes it possible to avoid introducing biases or instability due to the deformation of the resonances caused by the excitation of wrong polarization.

The phase-modulated radiation is then injected into the cavity C. This cavity may be any type of resonant optical cavity known to those skilled in the art: fiber or non-fiber linear or ring cavity. It has a resonant mode centered at the center frequency $f_c$ with a linewidth $\Delta f_c$. FIGS. 3A and 3B show a first coupling means M1 and a second coupling means M2 for coupling the laser beam LL to the cavity. These means may typically be mirrors or couplers in the case of a fiber cavity.

The device D comprises a single photodiode PDr or PDt designed to detect radiation transmitted or reflected by the cavity, respectively. The photodiodes PDr, PDt respectively generate a signal Sr, St representative of the intensity of the detected laser beam.

The device according to the invention and the associated methods implemented by the device work with a single photodiode, and therefore uses either the signal Sr detected by PDr, or the signal St detected by PDt. Hereinafter, the signal that is used is symbolized by St, Sr generated by the photodiode PDt, PDr.

The photodiode PDr is illuminated by the radiation reflected by C and then isolated by the optical circulator CO. Critically, for operation in reflection mode (that is to say servo control using the photodiode PDr), it is necessary for the sidebands to be as far as possible outside the resonance of the cavity, preferably but not necessarily $$f_{mod} \gg \Delta f_c / 2.$$

If they are not, the behavior of the error signal at resonance is still linear as a function of $\delta v$, but the slope is smaller and the servo control may be less accurate or even impossible.

The photodiode PDt is arranged so as to be illuminated by the transmitted radiation, for example by the coupling means M2. For operation in transmission mode (that is to say servo control using the photodiode PDt), it is necessary for the sidebands to be coupled into the cavity and then transmitted thereby, that is to say within the resonance, $$i.e.\ f_{mod} < \Delta f_c.$$

If they are not, the sidebands would be reflected excessively by the cavity and the error signal would lose amplitude.

The device furthermore comprises a demodulation system Dem designed to demodulate the electrical signal at the modulation frequency $f_{mod}$. For this purpose, Dem comprises an electrical signal mixer Mix connected to the local oscillator OL, multiplying the signal generated by the photodiode by a signal of the form $A\cos$ $$A\cos(\omega_{mod} t + \phi_{dem}).$$

Importantly, the mixer Mix is designed to synchronously generate a first demodulated signal and a second demodulated signal. The first demodulated signal is representative of the electrical signal St, Sr demodulated at a first demodulation phase $\phi_{dem,1}$, that is to say of the signal St, Sr multiplied by $$A\cos(\omega_{mod} t + \phi_{dem,1}).$$

The second demodulated signal corresponds to the demodulated electrical signal St, Sr at a second modulation phase $\phi_{dem,2}$ different from said first demodulation phase, such that $$\phi_{dem,2} \approx \phi_{dem,1} \pm k, \text{ with } k \in [0; 2\pi],$$

that is to say the signal St, Sr multiplied by $A\cos$ $$A\cos(\omega_{mod} t + \phi_{dem,1} \pm k).$$

Preferably, the second demodulated signal corresponds to the demodulated electrical signal St, Sr at a second modulation phase $\phi_{dem,2}$ substantially in quadrature with said first demodulation phase, such that $$\phi_{dem,2} \approx \phi_{dem,1} \pm \pi/2.$$

Substantially in phase quadrature is understood here to mean that $$\phi_{dem,2} = \phi_{dem,1} \pm \frac{\pi}{2} \pm 5\%.$$

As will be explained later, generating two error signals with these demodulation phases in phase quadrature is one possibility for guaranteeing that, by servo-controlling the two signals to zero, the laser and the cavity are properly locked and that biases due to the RAM are eliminated. The choice of two demodulation phases in quadrature is not mandatory, and it will moreover be shown that a choice of appropriate demodulation phases that are not in quadrature allows decoupling between the servo control in order to cancel out the RAM and servo-control the laser.

In addition, the demodulation system comprises a low-pass filter LP designed to filter the first and the second signal so as to retain only a DC component of the first demodulated signal, called error signal 1, denoted $V_{\epsilon_1}$, and of the second demodulated signal, called error signal 2, denoted $V_{\epsilon_2}$.

Finally, the device comprises a processor UT configured to process the first and the second error signal. This processor UT is furthermore configured to servo-control the laser L to the cavity on the basis of the signals $V_{\epsilon_1}$ and $V_{\epsilon_2}$ (see below), by maintaining a supply voltage value that allows a zero difference $\delta v=0$. Finally, the processor makes it possible to servo-control the phase modulator PM by maintaining a voltage value $V_{dc,pm}$ supplied to PM that makes it possible to cancel out the RAM (see below).

Figure 4:
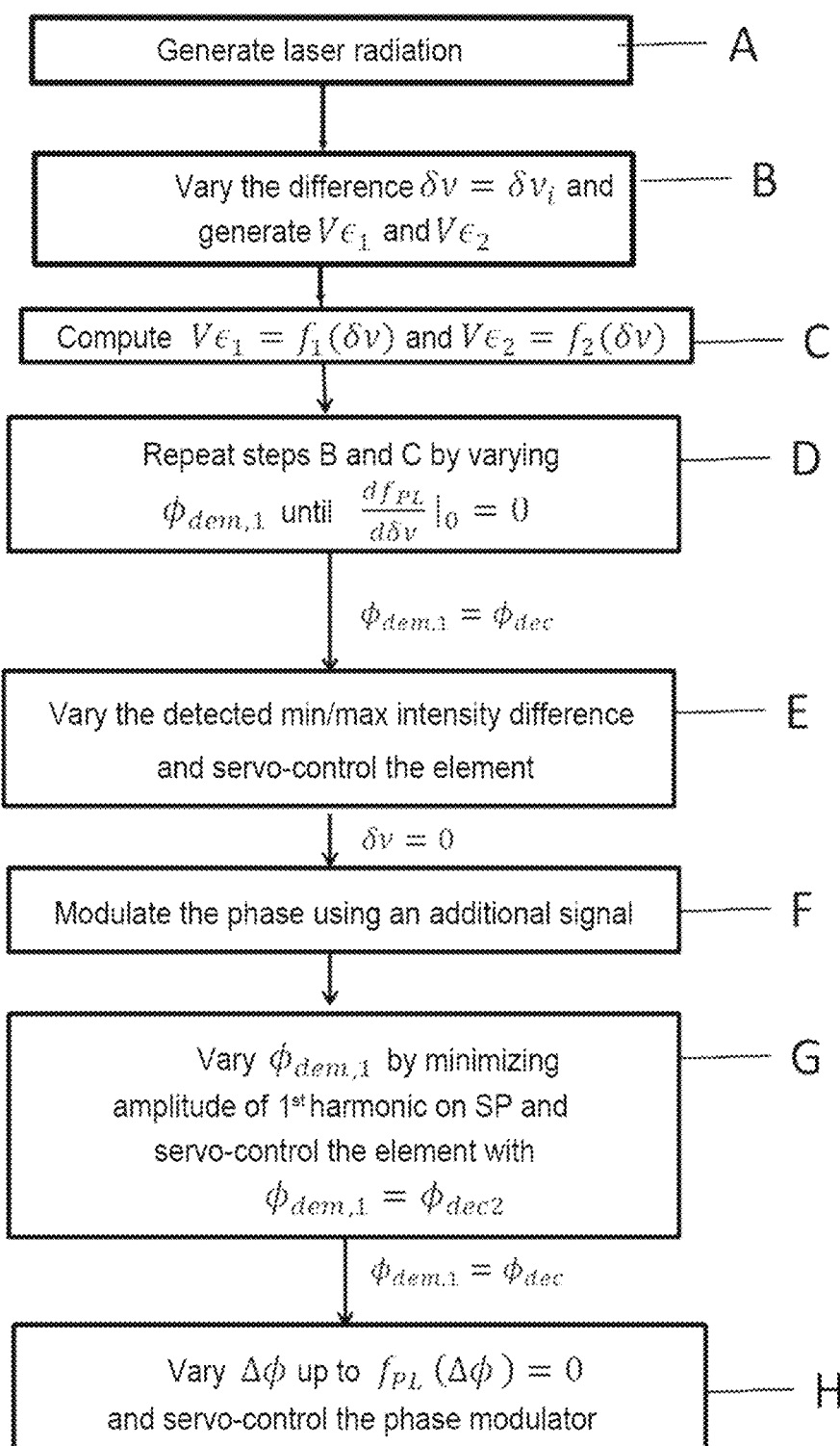
FIG. 4 shows a method according to the invention, FIGS. 5A and 5B respectively show one example of the PL and SP functions, before servo control, at the decoupling phase $\phi_{dec}=-73.16°$ as a function of $\delta v/ISL$, FIGS. 6A and 6B respectively show one example of the PL and SP functions, before servo control, at the decoupling phase $\phi_{dec}=92.44°$ as a function of $\delta v/ISL$, with the same parameters of the cavity as those used for FIGS. 5A and 5B, for operation in reflection mode.

FIG. 4 illustrates a method designed to servo-control the cavity C to the laser L or vice versa and to compensate for the amplitude modulation introduced by a phase modulator PM. This method is implemented by the device of FIGS. 3A, 3B and 6 to 9.

This method comprises a first step A) consisting in using the laser L to generate the laser radiation LL at the optical frequency $f$ within the resonance $\Delta f_c$ of the cavity C. Next, in a step B, the difference $\delta v$ between the optical frequency of LL and the center frequency $f_c$ of the resonance is varied, such that the optical frequency scans the resonance. Thus, the difference $\delta v$ adopts a plurality of values ($\delta v_1, \ldots \delta v_k, \ldots, \delta v_n$), and there is a plurality of differences $\delta v_j$ such that $\delta v_j < 0$, and there is a plurality of differences $\delta v_i$ such that $\delta v_i > 0$. As explained above, the difference is controlled by a parameter of an element of the device, this element possibly being the laser L, the acousto-optic modulator AOM or a piezoelectric translation stage TS.

For each difference $\delta v_i$, the following sub-steps i-iv are carried out:

A step i) consisting in modulating, at a modulation frequency $f_{mod}$, a phase of the laser radiation LL, through a modulation phase $\phi_{mod}$, with the phase modulator PM. The modulation frequency of PM is set by the local oscillator OL.

A step ii) consisting in injecting the phase-modulated radiation LL into the cavity C.

A step iii) consisting in using a photodiode $PD_t$, $PD_r$ to detect radiation reflected or transmitted by said cavity. The photodiode generates an electrical signal St, Sr representative of the intensity of the detected radiation.

Finally, a step iv) consisting in demodulating, using the modulation system Dem, the electrical signal St, Sr at the modulation frequency $f_{mod}$ by synchronously generating a first demodulated signal and a second demodulated signal representative of the demodulated electrical signal, respectively at a first demodulation phase $\phi_{dem,1}$ and at a second modulation phase $\phi_{dem,2}$. This pair of phases may a priori adopt any values as long as they satisfy the condition set out in the appendix (condition A). To be sure of satisfying this condition, the second phase may be chosen to be substantially in quadrature with said first demodulation phase, such that $$\phi_{dem,2} \approx \phi_{dem,1} \pm \pi/2.$$

Step iv additionally comprises a step of using the low-pass filter LP to filter the first and the second demodulated signal so as to retain only a DC component of the first demodulated signal $V\epsilon_1$, called error signal 1, and of the second demodulated signal $V\epsilon_2$, called error signal 2.

In a step C), the error signals $V\epsilon_1$ and $V\epsilon2$ obtained for each difference $\delta v_i$ are processed by the processor UT. Step C) comprises computing a function $f_1$ and a function $f_2$ respectively representing a change in the error signal 1 and a change in the error signal 2 as a function of the difference $\delta v$ for a given value of $\phi_{dem,1}$ and $\phi_{dem,2}$. Thus, $$V\epsilon_1 = f_1(\delta v) \text{ and } V\epsilon_2 = f_2(\delta v).$$

$f_1$ and $f_2$ may be computed using any analytical method known to those skilled in the art. $f_1$ and $f_2$ are the two error functions that will make it possible to correct the RAM while servo-controlling the laser to the cavity (or vice versa) using a single photodiode PDr, PDt without inducing any error related to the birefringence of components contained in the device.

A description is now given of the method that makes it possible to adjust the pair of demodulation phases in order to decouple the servo-control operations. The method of FIG. 4 comprises a step D consisting in repeating steps B) and C) by varying the first demodulation phase $\phi_{dem,1}$ (it being understood that the variation in $\phi_{dem,1}$ leads to that of $\phi_{dem,2}$, which remains at $\phi_{dem,1}+k$) between each repetition until, for a value of the first demodulation phase, called decoupling phase $\phi_{dem,1}=\phi_{dec}$, function 1 or function 2 has a plateau on a portion P of values of the difference $\delta v$ comprising 0. The correct demodulation phase is found when the plateau corresponds to a voltage of zero or almost zero. If it is initially at a non-zero voltage, it is necessary to bring the level of the plateau back to the zero voltage by applying a voltage $V_{DC}$ to modify $\Delta\phi^{dc}$ applied to the phase modulator. During this adjustment of the level of the plateau, the shape of the demodulated signal risks being modified, and there is the risk of observing that the signal no longer has a plateau. It is then necessary to act concomitantly on the demodulation phase in order to maintain the plateau. The portion P comprises values of $\delta v$ that are all in the vicinity of 0. Hereinafter, for greater clarity, PL function is the name given to the function out of 1 or 2 having the plateau as a function of the difference at resonance, and SP function is the name given to the function not having the plateau. The SP function has a slope and linear behavior around the resonance $\delta v=0$ that allow the cavity to be servo-controlled. "Have a plateau" is understood to mean that, on the portion P, the derivative of the PL function is canceled out, that is to say $$\frac{df_{PL}}{d\delta v}|_0 = 0.$$

The LP function will be used to servo-control the RAM because, as shown by the equations presented in the appendices, this function is linear as a function of the RAM around the servo-controlled value, which cancels out the effect of the RAM.

The PL signal, used to control the RAM, is thus decorrelated (to be understood here to be independent) from the differences $\delta v$. In other words, the signal applied to the phase modulator does not contain any component due to the fluctuations of the laser around the resonance of the cavity. Thus, the PL error signal whose function has a plateau has two particular properties: close to resonance, it is independent of the laser frequency (presence of a plateau), but it depends linearly on the phase $\Phi$ mod (see appendix and FIGS. 13A, 13B). The SP signal is used to servo-control the difference $\delta v$. to zero.

Figure 5A:
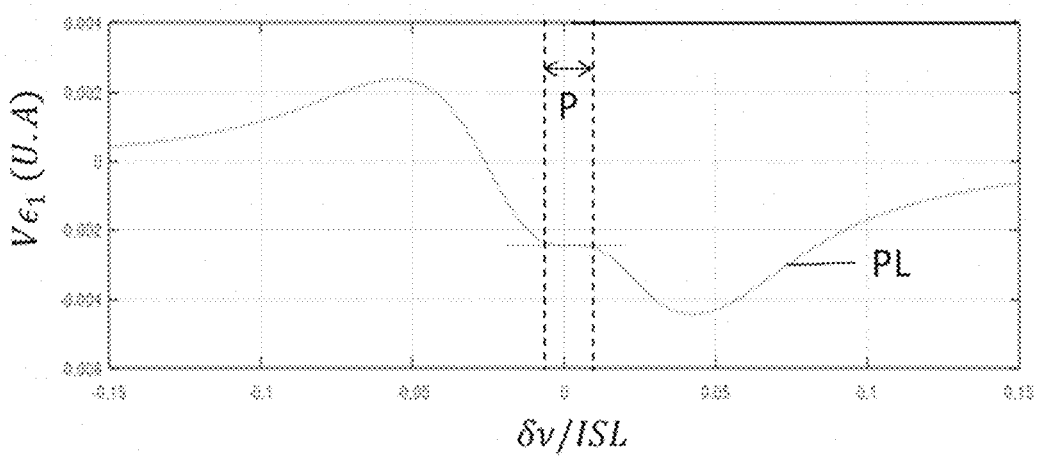
Figure 5B:
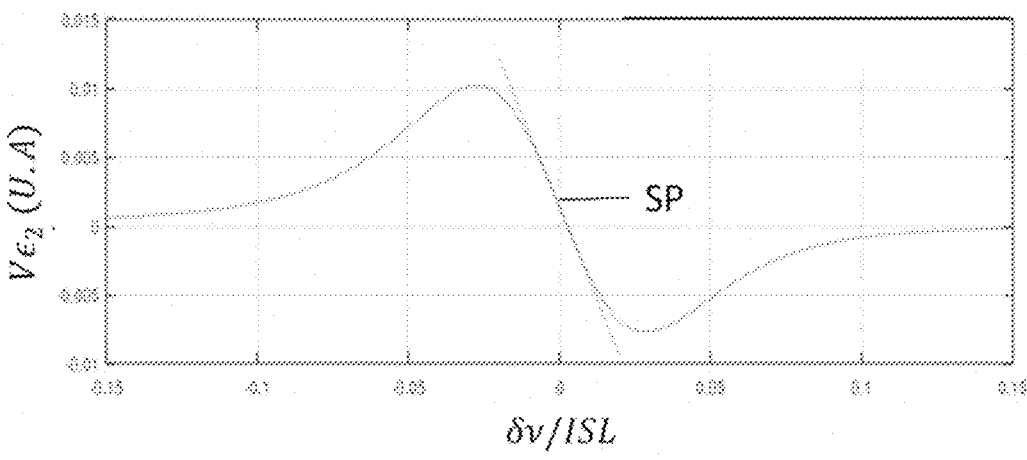

FIGS. 5A and 5B respectively show one example of the PL and SP functions, before servo control, at the decoupling phase $\phi_{dec}$ as a function of $\delta v/ISL$, where ISL is the free spectral range of the cavity C. As a reminder, $$ISL = c/L_{cav}, \text{ where } L_{cav}$$

is the optical length (which takes into account the index) of the cavity for a ring cavity and $$ISL = c/2L_{cav}$$

for a linear cavity. In this example, by way of non-limiting example, it is function 1 associated with the error signal $Ve_1$ that has a plateau at the decoupling phase $$\phi_{dec} = -73.16°$$

and that therefore corresponds to the PL function. Function 2, associated with the error signal $Ve_2$, therefore corresponds to the SP function. For a decoupling phase of $$\phi_{dec} = -73.16° + 90° = 16.84°,$$

this would be the opposite. By way of non-limiting example, the cavity C used to obtain these functions shown in FIGS. 5A and 5B has a finesse of F=12, a linewidth of $$\Delta f_c = 1.2 \text{ MHz}$$

and a free spectral range ISL=16 MHz. The functions are obtained in a transmission operating mode (detection with PDt), with $$f_{mod} = 400 \text{ kHz}.$$

This thus gives $$f_{mod} < \Delta f_c/2.$$

FIG. 5A makes it possible to observe that the PL function indeed has a plateau on the portion P that is not zero, because the RAM is not zero in this simulation. It is on the basis of this function that the RAM will be canceled out and the servo control for ensuring that the canceling out of the RAM will be maintained will be carried out. FIG. 5B makes it possible to observe that the SP function has a slope in the vicinity of $\delta v/ISL$ on the portion P. It is this slope and the linear behavior of the SP function around the resonance that would make it possible to servo-control the optical frequency of the laser to the cavity (or vice versa).

It is therefore possible to use this pair of demodulation phases. However, at this stage, the SP signal is not decorrelated from the RAM.

Figure 6A:
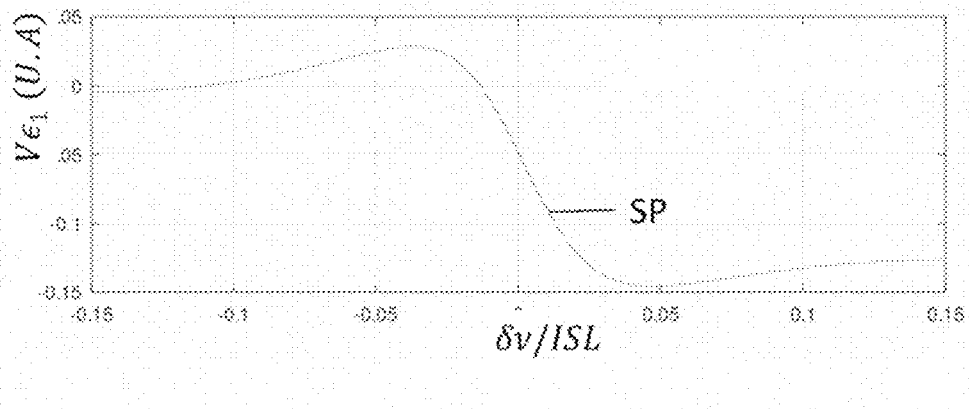
Figure 6B:
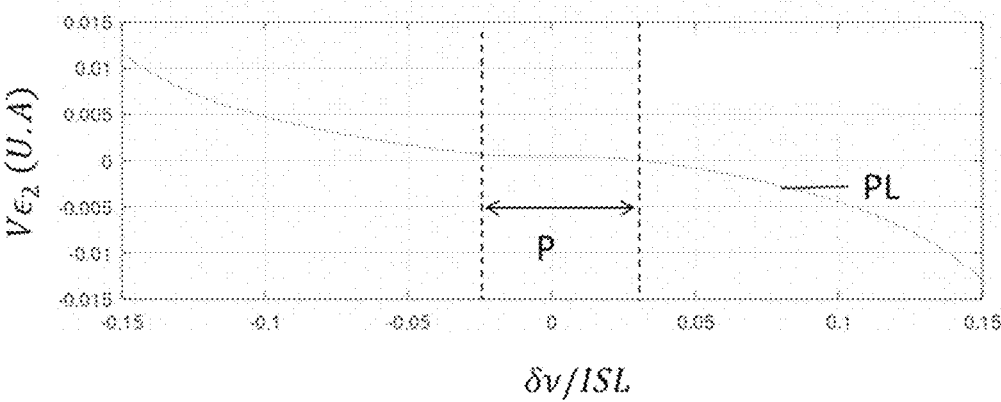

FIGS. 6A and 6B respectively show one example of the PL and SP functions, before servo control, at the decoupling phase $\phi_{dec}$ as a function of $\delta v/ISL$, with the same parameters of the cavity C as those used for FIGS. 5A and 5B, for operation in reflection mode (detection on PDr). Here, by way of non-limiting example, $$f_{mod} = 4 \text{ MHz}.$$

This therefore gives $$f_{mod} > \Delta f_c/2.$$

Moreover, $$\phi_{dec} = 92.44°,$$

and it is function 2 that corresponds to the PL function, while function 1 corresponds to the SP function. In these figures, on a portion of values P, it is indeed possible to observe the presence of a plateau for the PL function and a linear variation of the SP function.

After step D), the method of FIG. 4 comprises a step E consisting, at the decoupling phase $\phi_{dec}$, in varying the difference $\delta v$ so as to maximize the intensity of the light radiation detected by the photodiode PDt in transmission mode and minimize the intensity of the light radiation detected by the photodiode PDr in reflection mode. It is therefore sought, in both cases, to reach an extremum of the intensity. This maximum or minimum intensity is obtained for a difference $\delta v$ of almost zero since, as the RAM is not yet controlled, it introduces a bias on the signal SP. This signal may be zero while the laser is not properly locked to a resonance of the cavity (this is what poses a problem). As an alternative, step E consists in varying δv until the SP function is canceled out.

After canceling out SP, step D) comprises, in step E, a step of servo-controlling the element (laser L, AOM or piezo-electric stage TS) to a value of the parameter that makes it possible to control the difference δv so as to maintain the canceling out of the SP function and this intensity quasi-maximum on PDt and this intensity quasi-minimum on PDr. This servo control step is performed by the processor UT via feedback electronics that are known per se, using conventional servo control methods, for example, without being restrictive, with PI or PI D feedback electronics. This type of feedback for making the error signal converge toward a desired value is well known in automation. Since the RAM is not yet controlled at this stage of the method, the canceling out of the SP function does not necessarily correspond to a resonance, that is to say that the transmitted intensity is not necessarily at a maximum or the reflected intensity is not necessarily at a minimum. The decoupling phase, that is to say the phase for which an error function having a plateau is obtained, makes it possible to servo-control the laser frequency to the resonance (or vice versa) by using the SP signal and then to servo-control the PM in order to cancel out the RAM (see below).

After step E, in order to make the SP signal independent of the RAM, in a step F, when the laser and the cavity are locked to one another, a periodic signal, called additional signal, with what is called an additional modulation frequency $f_{add}$, which is added to the RF modulation at the modulation frequency $f_{mod}$, is applied to the phase modulator PM. In other words, the PM is modulated by two signals simultaneously, a first at the frequency $f_{add}$ and a second at the modulation frequency $f_{mod}$. The frequency $f_{add}$ of this additional signal should be significantly lower than the modulation frequency $f_{mod}$, such that it may be considered that the DC bias of the phase modulator (that is to say the DC component) is modulated. "Significantly lower" is understood here to mean 10 times, preferably 20 times lower. The additional signal may be any periodic signal commonly used in signal processing by those skilled in the art, for example a triangular-wave, square-wave, sinusoidal or else sawtooth signal. The correction signal applied to the laser or to the cavity, that is to say the one generated by the servo control via the SP function, is also modulated due to the additional periodic signal.

The equations in the appendix show that it is possible to find what is called an additional demodulation phase $$\phi_{dem,1} = \phi_{dec2}$$

such that the SP function no longer depends on the RAM.

To find this additional demodulation phase $\phi_{dec2}$, the demodulation phase is varied until the modulation on the SP function is attenuated as much as possible by the additional modulation on the phase modulator. In order to achieve this, the method comprises a step G, which consists in minimizing, on the signal SP, an amplitude of a first harmonic of the additional signal, by varying the first demodulation phase, this minimum being reached for the demodulation phase $\phi_{dec2}$. Specifically, this minimization is achieved through spectral analysis of the SP function (for example with a Fourier transform). After having found this additional demodulation phase $\phi_{dec2}$, the additional signal is no longer applied to the phase modulator PM. The element (laser L, AOM or piezoelectric stage TS) is then again servo-controlled to a value of the parameter that makes it possible to maintain this intensity extremum, at the additional phase $\phi_{dec2}$.

Thus, by using these two decoupling demodulation phases $\phi_{dec2}$ and $\phi_{dec}$ respectively to lock the laser and the cavity and servo-control the RAM, use is made of signals that are decorrelated, that is to say that the laser servo control signal depends barely or not at all on the RAM and the RAM servo control signal depends barely or not at all on a difference at resonance.

Finally, the method of FIG. 4 comprises a last step H) consisting, at the decoupling phase $\phi_{dec}$ and at the zero difference, in varying the first modulation phase $\phi_{mod,1}$ until the PL function is canceled out and maintaining the canceling out by servo-controlling the phase modulator PM. Indeed, when the RAM is not controlled, the plateau around the resonance is not at a zero value, as may be seen in FIG. 4. More specifically, step H) consists in varying the DC voltage $V_{dc,m}$ supplied to the phase modulator up to what is called a RAM voltage value that makes it possible to cancel out the PL function and to servo-control said phase modulator to the RAM voltage. In this case too, this servo control step is performed by the processor UT via feedback electronics that are known per se, using conventional servo control methods, for example, without being restrictive, with PI or PID feedback electronics. In practice, for the zero difference and at the decoupling phase $\phi_{dec}$, $V_{dc,m}$ is sought, such that $$f_{PL}(\phi_{mod}) = 0,$$

where $f_{PL}$ is the PL function. The canceling out of the PL function makes it possible to cancel out the RAM and makes it possible to carry out servo control to the value of the DC voltage $V_{dc,m}$ supplied to the phase modulator even if there is a small difference at resonance (see below); this is the benefit of the decoupling phase $\phi_{dec}$. This DC voltage $V_{dc,m}$ is added to the modulation voltage of the PM coming from OL.

Thus, the method of FIG. 4 makes it possible, by choosing an appropriate demodulation phase, to servo-control the phase modulator PM so as to cancel out the RAM and servo-control the optical frequency $f$ of the laser beam LL to the resonance of the cavity (or vice versa) using detection of the radiation transmitted or reflected by the cavity C on one and the same photodiode PDt, PDr. The problems related to the difference in birefringence on the optical path that goes to the RAM control photodiode and the payload optical path that goes to the rest of the experiment are therefore solved by the method of FIG. 4, since it is the same photodiode that is used to control the RAM. Similarly, unlike the prior art, it is no longer necessary to ensure that the demodulation phase used to generate the error signal that is used to lock the laser is the same as that used to cancel out the RAM on the RAM control photodiode.

Figure 7:
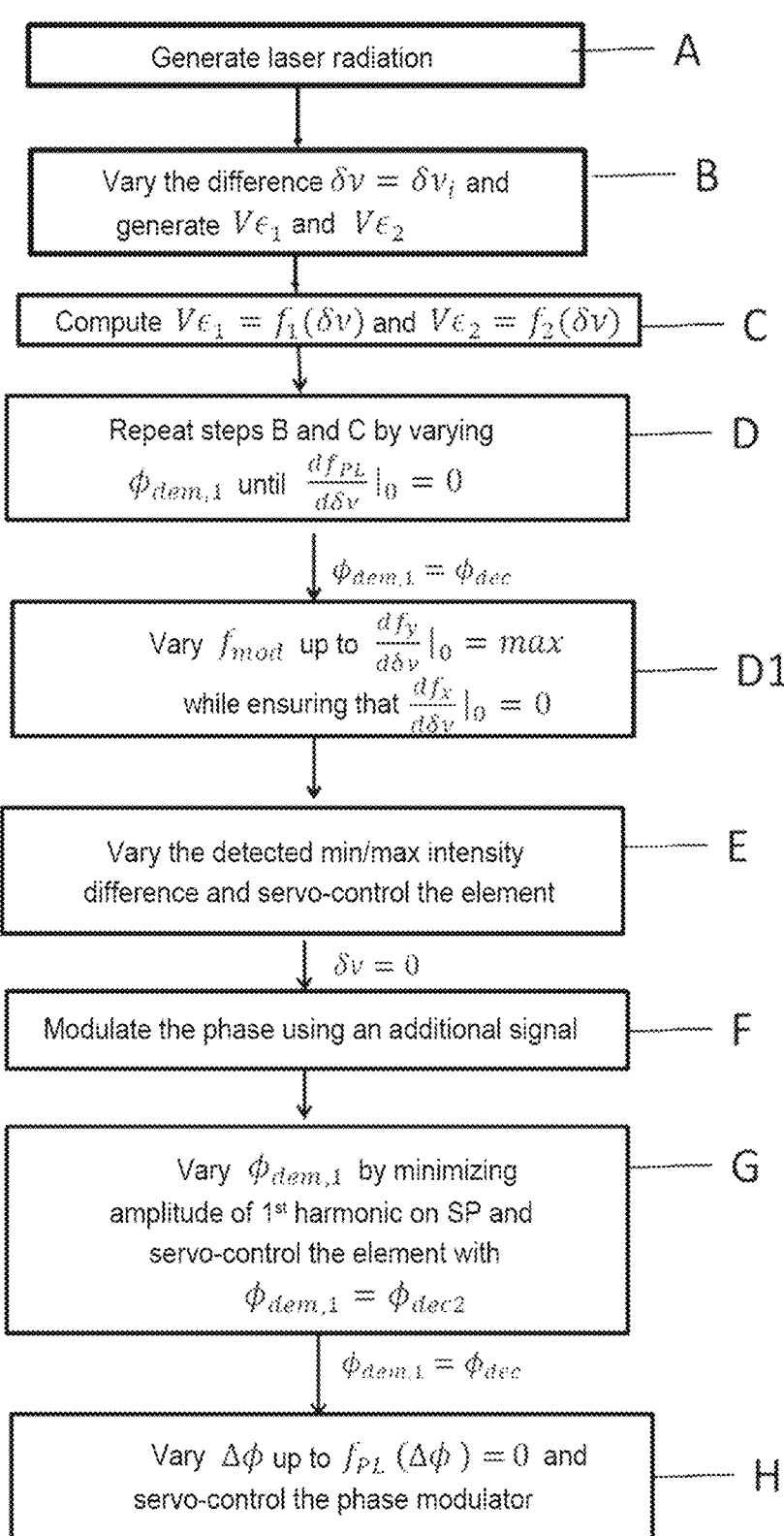
FIG. 7 shows one embodiment of the method of FIG. 4.

FIG. 7 illustrates another embodiment of the method of FIG. 4. In this embodiment, all of the steps are identical to that of the method of FIG. 4, except for the fact that it comprises a step D1), after step D) and before step E), consisting in varying the modulation frequency $f_{mod}$ until a slope of the SP function is at a maximum on the portion P of values, by repeating step D for each modulation frequency. This step is implemented by the processor UT. In specific terms, this step D1 consists in maximizing the slope of the SP function by varying the modulation frequency $f_{mod}$, while ensuring that the decoupling phase $\phi_{dec}$ is always in place, that is to say by iteratively varying the demodulation phase $\phi_{dem,1}$ such that the PL function always has a plateau on the portion P. Indeed, the variation of the modulation frequency induces variations on electronic delays that will modify the demodulation phase. Step D1 therefore makes it possible to define an optimum modulation frequency-decoupling phase pair ($f_{mod,o}$; $\phi_{dec,o}$) for which the slope of the SP function is maximized in its linear part, and therefore for which servo control is facilitated and the measurement sensitivity for the frequency offset with respect to the resonance is increased. Indeed, the slope is measured in V/Hz, and the greater this slope, the more sensitive it will be to a measurement of frequency (Hz) on the error signal (V). Measuring the error signal (servo-controlled to zero, but in practice never equal to zero) and multiplying its value by the slope gives our frequency shift $\delta v$. With a high slope, it is easier to discriminate the measurement by one Hz. This method is only able to work with detection in transmission mode, that is to say detection using the photodiode PDt and $f_{mod} < \Delta f_c / 2$. Indeed, it may be demonstrated that, in reflection mode, the modulation frequency for obtaining the maximum slope for the SP function causes the PL function to be canceled out. It is therefore impossible to achieve servo control of the PM that makes it possible to cancel out the RAM.

Figure 8:
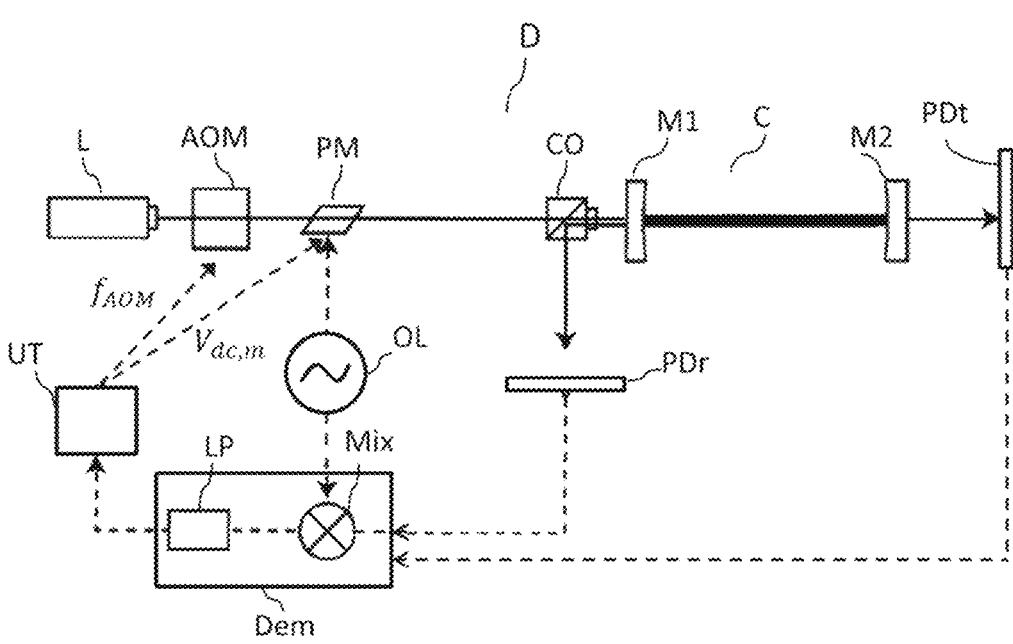
FIG. 8 shows a device identical to that of the embodiment of FIG. 3, except for the fact that the servo control is carried out to an acousto-optic modulator.
Figure 9:
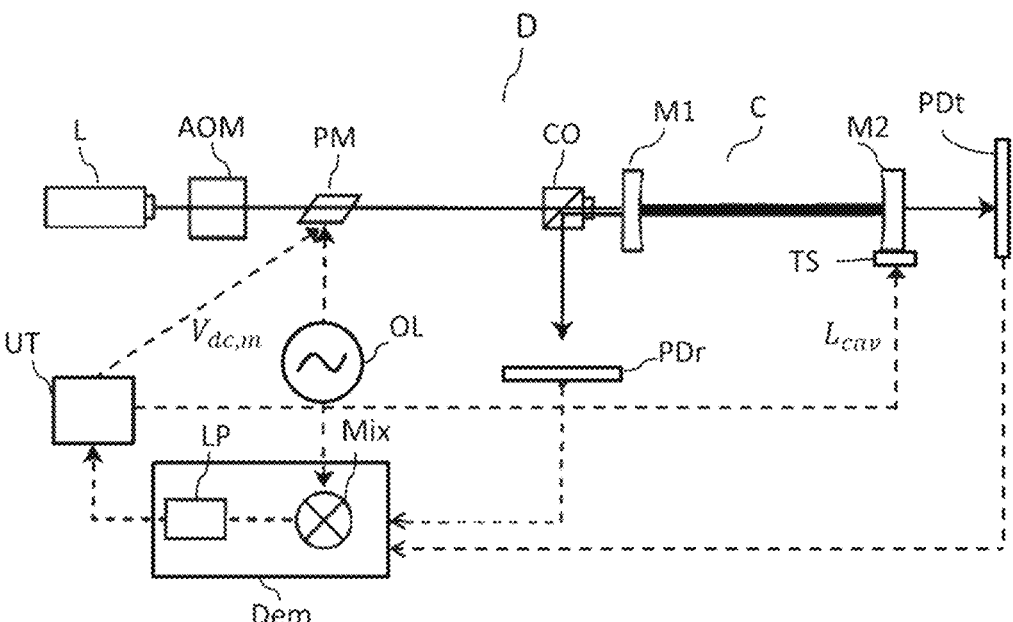
FIG. 9 shows a device identical to that of the embodiment of FIG. 3, except for the fact that the servo control is carried out to a piezoelectric translation stage to which a component of the cavity is fixed.

FIGS. 8 and 9 illustrate devices identical to that of the embodiment of FIG. 3, with the exception of the fact that, in these devices, the servo control is carried out respectively to an acousto-optic modulator AOM and to a piezoelectric translation stage TS to which a component of the cavity C is fixed. The two variants of operation in transmission mode and in reflection mode are illustrated here in one and the same diagram, but it is understood that the device works with only one of these two photodiodes.

In the embodiment of FIG. 8, the device D comprises an acousto-optic modulator AOM designed to shift and vary the optical frequency $f$ of the laser beam LL passing through it so that it is within a resonance of the cavity C. This modulator AOM is a component known to those skilled in the art. It is positioned before the phase modulator PM and after the laser L and is excited at a frequency $f_{AOM}$, which is the parameter for controlling the difference $\delta v$. This device is designed to implement the methods of FIGS. 4 and 7, the processor UT being configured to servo-control the AOM to a value of the excitation frequency $f_{AOM}$ that makes it possible to reach the zero difference by maximizing the intensity detected on the photodiode PDt, PDr or by canceling out the SP function (step E). This AOM may be advantageous for example in order to reach an optical frequency of the laser radiation that is difficult to reach by simply varying the DC voltage supplied to L. The AOM is frequency-controlled, unlike the laser in the previous example. The AOM has an accuracy that may be sub-hertz (accuracy below Hz), which is highly practical for servo-controlled frequency measurement applications.

In the embodiment of FIG. 9, the device D comprises a piezoelectric translation stage TS to which a component of the cavity C is fixed. This element may be for example the first coupling means M1 or the second coupling means M2 (for example laser mirrors). The translation stage TS is designed to vary the length $L_{cav}$ of the cavity by displacing one of the coupling means relative to the other and thus to vary the center frequency $f_c$ of the resonance (and therefore to vary $\delta v$). Indeed, in the case of a linear cavity, there is resonance at the center frequencies $$f_c = k \cdot \frac{c}{2L_{cav}},$$

with $k \in \mathbb{N}^*$. In the case of a ring cavity, there is resonance at the center frequencies $$f_c = k \cdot \frac{c}{L_{cav}},$$

with $k \in \mathbb{N}^*$. In the embodiment of FIG. 9, the length of the cavity is therefore the parameter controlling $\delta v$. This device makes it possible to servo-control the cavity to an optical frequency $f$ of the laser (which may for example be fixed) and is designed to implement the methods of FIGS. 4 and 7. In these methods, step E) is implemented by the processor UT, which servo-controls the translation stage to a value of the length $L_{cav}$ of the cavity, making it possible to reach the zero difference by maximizing the intensity detected on the photodiode PDt, PDr or by canceling out the SP function.

Figure 10:
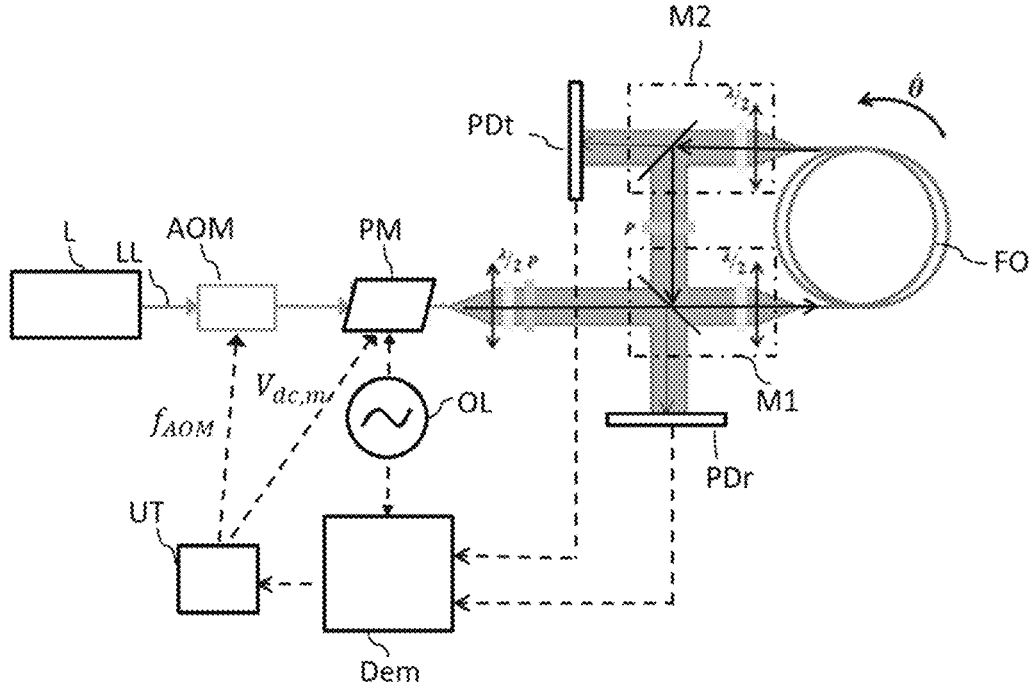
FIG. 10 shows an embodiment identical to the device of FIG. 8, except for the fact that the cavity is a ring cavity and comprises an optical fiber.

FIG. 10 shows an embodiment identical to the device of FIG. 8, except for the fact that the cavity C is a ring cavity and comprises an optical fiber FO. The first and second coupling means M1, M2 are configured to couple the radiation LL injected into the cavity with the optical fiber FO. In the embodiment of FIG. 10, these coupling means each comprise a mirror and a lens. Depending on the direction of injection of the beam LL into the cavity C, one means is designed to focus the beam in the fiber and the other means is designed to collimate the laser beam at the output of the fiber. In the illustration of FIG. 10, and by way of non-limiting example, the direction of injection of the beam into the cavity is anticlockwise. The arrangement of the photodiodes PDr and PDt depends on the direction of injection.

For a clockwise direction of injection, the position of the injection channel (the one that comprises the laser, the AOM, the phase modulator PM) and the detection channel in reflection mode comprising the photodiode PDr is inverted with respect to the arrangement of FIG. 10. Similarly, the position of the detection channel in transmission mode (the one that comprises the photodiode PDt) will also have to be displaced perpendicular to the beam shown as leaving the optical fiber FO with respect to the arrangement illustrated in FIG. 10.

If the fiber FO is polarization-maintaining, the device D may comprise (as illustrated in FIG. 10) a $\lambda/2$ plate at input and at output of the fiber associated with a polarizer between M1 and M2 in order to set the axis of polarization of the beam within the cavity to that of the fiber FO.

Like the devices according to the invention presented above, the photodiodes of the device of FIG. 10 are connected to the demodulation system Dem and the signals coming from Dem are processed by the processor UT, which servo-controls the laser optical frequency to the cavity C and servo-controls the PM in order to cancel out the RAM, according to the methods of the invention.

In the embodiment of FIG. 10, the laser optical frequency is servo-controlled to the AOM by the processor UT by controlling the excitation frequency. As an alternative, according to another embodiment, the device does not comprise the AOM and the servo control performed by the processor UT is servo control of the laser to the resonant frequency of the cavity (as in the device of FIG. 3). It is also possible to servo-control a piezoelectric translation stage to which one end of the optical fiber or one of the mirrors of the cavity is fixed (as in the device of FIG. 9).

As an alternative, if the cavity is a fully fiber cavity, the first coupling means M1 and the second coupling means M2 comprise a fiber coupler, for example a 1×2 coupler for extracting (or coupling, depending on the direction of injection) part of the radiation LL contained in the cavity (or toward the cavity, depending on the direction of injection).

As an alternative, according to another embodiment, the means M1 and M2 may comprise only a mirror if the latter is an off-axis parabola, for example.

The advantage of using a ring cavity like that of the device of FIG. 10 is that it makes it possible to produce a passive resonant gyrometer. The measurement of the rotational speed in a resonant gyrometer is based on the fact that the free spectral range of a resonant cavity is modified by the rotation thereof (Sagnac effect). However, since there is no gain medium in the passive resonant cavity, the optical frequency of the laser beam LL has no reason to follow what is known as the resonant frequency of the cavity (integer multiple of the free spectral range), which will be modified by rotation. This is why, in the case of a resonant gyrometer, it is necessary to servo-control the laser or an AOM, making it possible to follow the resonant frequency of the cavity over time.

Figure 11:
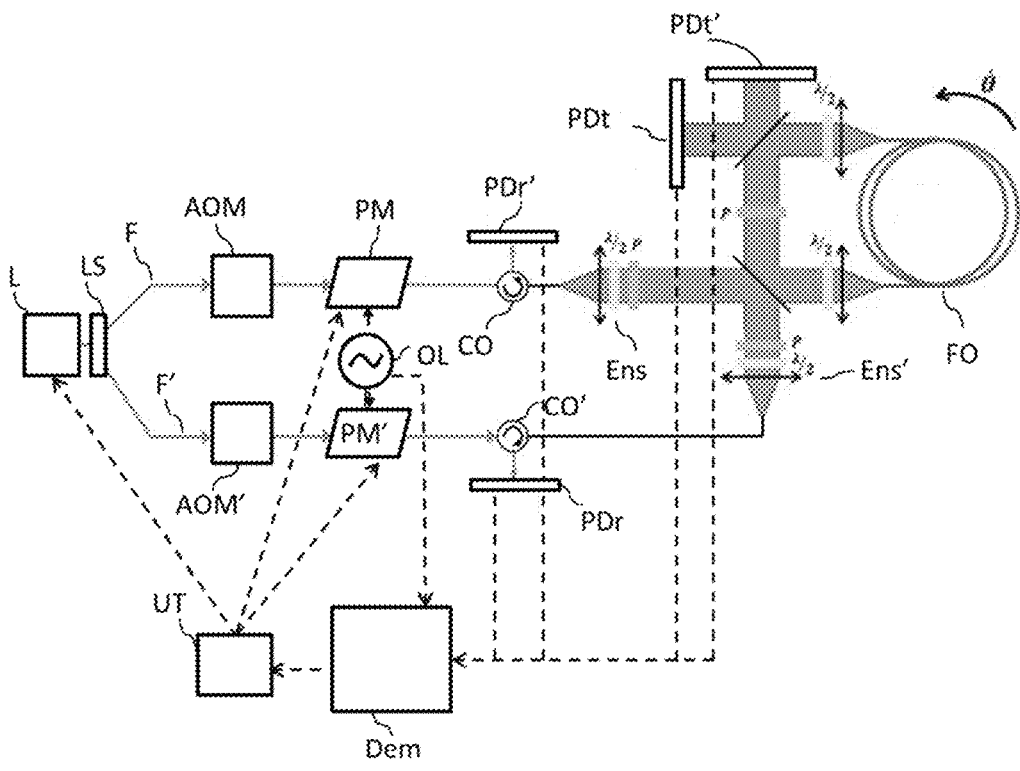
FIG. 11 shows one embodiment of the invention in which the device D comprises a passive resonant ring cavity C into which it is possible to inject the laser beam in a first direction, through a first optical channel, and in a second direction, through a second optical channel, FIGS. 12A and 12B respectively show a change in $$V_{\varepsilon_1} = \sum_{k=0}^{p} \mathrm{Re}(b_k)\cos(\varphi_{dem}) + \mathrm{Im}(b_k)\sin(\varphi_{dem}) \text{ and in } V_{\varepsilon_2} =$$

FIG. 11 shows one embodiment of the invention in which the device D comprises a passive resonant ring cavity C into which it is possible to inject the laser beam in a first direction (anticlockwise), through a first optical channel F, and in a second direction (clockwise), through a second optical channel F'.

In the embodiment of FIG. 11, the device comprises an optical splitter LS designed to split the laser radiation LL into the first and the second optical channel. This optical splitter LS may be a 50/50 splitter plate if the propagation of the beam is in free-space mode, or a 1×2 coupler if the propagation of the beam is fibered.

The first optical channel comprises the acousto-optic modulator AOM, the phase modulator PM and the optical circulator CO positioned after the phase modulator. The second optical channel comprises an additional acousto-optic modulator AOM', an additional phase modulator PM' and an additional optical circulator CO' positioned after the additional phase modulator.

The modulators PM and PM' modulate the phase at a frequency imposed by the local oscillator OL. As an alternative, according to another embodiment, each phase modulator is modulated at a frequency that may be different from the other, imposed by a local oscillator associated with this modulator. As explained above, the presence of the modulators AOM and AOM' are optional in the device of FIG. 11.

The optical circulator CO is designed to direct the laser radiation injected in the second direction (anticlockwise) and then reflected by the cavity C toward an additional reflection photodiode PDr'. The additional optical circulator is designed to direct the laser radiation injected in the first direction (clockwise) and then reflected by the cavity C toward the photodiode PDr. These optical circulators are typically based on a Faraday rotator positioned between two polarization splitter cubes.

The optical path of the laser beam after the phase modulation is fibered in both optical channels. In one non-limiting example, the optical fibers positioned after the modulator PM and PM' are polarization-maintaining.

The device of FIG. 11 comprises a cavity C identical to the one shown in FIG. 10. In the device of FIG. 11, the optical path of the first optical channel and the second optical channel between the phase modulator PM and the cavity C, and the additional phase modulator PM' and the cavity C, respectively, has a guided-optic configuration, for example using a polarization-maintaining or non-polarization-maintaining optical fiber, or else a planar waveguide.

In addition, the device of FIG. 11 comprises an optional assembly Ens and an optional additional assembly Ens', each consisting of a lens, a λ/2 plate and a polarizer. The assembly is positioned in front of the output of the fiber injecting the laser radiation coming from the first optical channel. The additional assembly is positioned in front of the output of the fiber injecting the laser radiation coming from the second optical channel. These assemblies Ens, Ens' make it possible to collimate the beam and to impose a polarization when it enters the cavity.

The device comprises a transmission photodiode PDt and an additional transmission photodiode PDt'. PDt is arranged so as to detect the radiation injected in the first direction into the cavity and then transmitted thereby. PDt' is arranged so as to detect the radiation injected in the second direction into the cavity and then transmitted by the cavity. It will be understood that, as in FIG. 3A, according to a first variant of the invention, the device comprises only the reflection photodiodes PDr, PDr' in order to servo-control the optical frequency and cancel out the RAM. As an alternative, as in FIG. 3B, in a second variant, the device comprises only the transmission photodiodes PDt, PDt'.

Like in the devices according to the invention presented above, the photodiodes are connected to the demodulation system Dem and the signals coming from Dem are processed by the processor UT, which servo-controls the laser optical frequency to the cavity C and servo-controls the PM in order to cancel out the RAM, according to the methods of the invention.

In the embodiment of FIG. 11, the laser optical frequency is servo-controlled by the processor UT to the laser L by controlling the DC supply voltage $V_{dc,L}$. As an alternative, according to another embodiment, the device comprises an AOM and the servo control performed by the processor UT is servo-controlling the AOM to the resonant frequency of the cavity (as in the device of FIG. 8) or else servo-controlling a piezoelectric translation stage to which one end of the optical fiber or one of the mirrors of the cavity is fixed (as in the device of FIG. 9).

APPENDIX

This part demonstrates the possibility of managing the canceling out of the RAM and the servo control of the laser to the cavity (or of the cavity to the laser) based on a single photodiode. It is then demonstrated that it is possible to decouple the canceling out of the RAM and the servo control of the laser to the cavity (or of the cavity to the laser) with two demodulation phases, called decoupling phases, using error signals generated based on this single photodiode.

The mathematical expression for the error signal is first sought.

Figure 2:
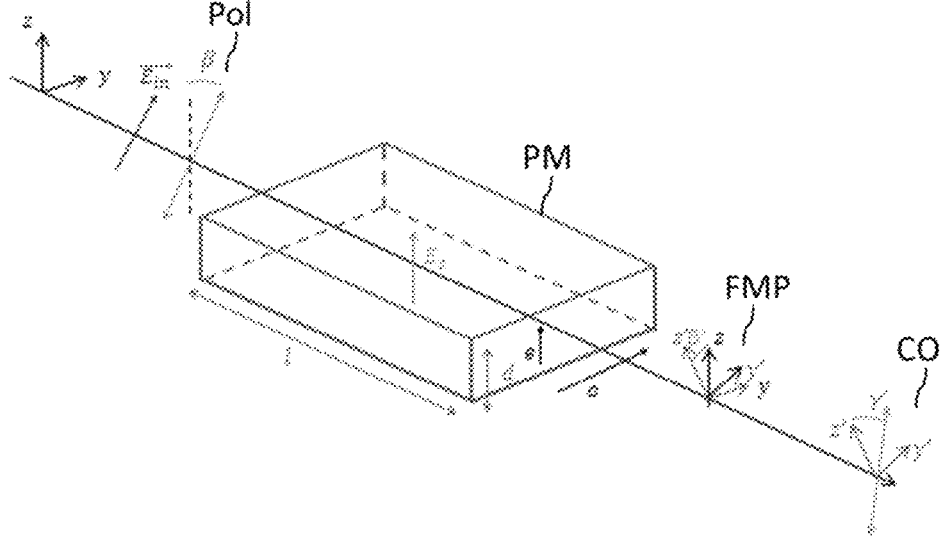
FIG. 2 shows a schematic view of the polarization state of light during propagation thereof within a phase modulator.

As demonstrated above, the field $E_{inj}$ of the radiation LL transmitted by the phase modulator PM and incident on the cavity C after passing through the birefringent components is of the form (see FIG. 2 and Equation 1):

$$E_{inj} = E_0 e^{i\omega t} e^{i\frac{\phi_s + \phi_f}{2}} \left[ |b'|e^{i(\phi_3 + \phi_{b'})} + |a'|e^{i(\phi_2 + \phi_{a'})} \right]\vec{\gamma}' =$$

$$E_0 e^{i\omega t} \left( |a'|e^{i\phi'_o} e^{i\delta_o \sin\omega_{mod}t} + |b'|e^{i\phi'_e} e^{i\delta_e \sin\omega_{mod}t} \right),$$

with $$\phi_{2,3} + \phi_{b',a'} = \phi_{o,e} + \phi_{o,e}^{dc} + \delta_{o,e}\sin\omega_{mod}t + \phi_{b',a'} = \phi'_{o,e} + \delta_{o,e}\sin\omega_{mod}t$$

and $\phi'_{o,e} = \phi_{o,e} + \phi_{o,e}^{dc} + \phi_{a',b'}$ therefore, through harmonic expansion of the modulation frequency:

$$E_{inj} =$$

$$E_0 \sum_{k=-\infty}^{+\infty} \left( |a'|e^{i\phi'_o} J_k(\delta_o) + |b'|e^{i\phi'_e} J_k(\delta_e) \right) e^{i(\omega + k\omega_{mod})t} = E_0 e^{i\omega t} \sum_{k=-\infty}^{+\infty} j_k e^{ik\omega_{mod}t}$$

with $j_k = |a'|e^{i\phi'_o} J_k(\delta_o) + |b'|e^{i\phi'_e} J_k(\delta_e)$ satisfying $j_{-k} = (-1)^k j_k$ The field reflected, $E_r$, or transmitted, $E_t$, by the cavity after modulation of the phase of the laser beam LL by PM at a frequency $\omega_{mod}$ is written:

$$E_{r,t} = E_0 \sum_{k=-\infty}^{+\infty} j_k F(\omega + k\omega_{mod}) e^{i(\omega + k\omega_{mod})t}$$

Where $F(\omega)$ is the transfer function in transmission mode or in reflection mode of the cavity.

The intensity reflected, $I_r$, or transmitted, $I_t$, by the cavity is written:

$$I_{r,t} = I_0 \sum_{k=-\infty}^{+\infty} \sum_{p=-\infty}^{+\infty} j_k \overline{J_p} F(\omega + k\omega_{mod}) \overline{F(\omega + p\omega_{mod})} e^{i(k-p)\omega_{mod}t},$$

where $I_0$ is the initial intensity at the input of the phase modulator.

If looking only at the frequency components (sidebands) at plus or minus the modulation frequency $\pm\omega_{mod}$, only the terms p=k+1 or p=k−1 are kept, that is to say:

$$I_{r,t} = I_0 \sum_{k=0}^{+\infty} \left[ -j_{k+1} \overline{J_k} F(\omega - (k+1)\omega_{mod}) \overline{F(\omega - k\omega_{mod})} + \right.$$

$$\left. j_k \overline{J_{k+1}} F(\omega + k\omega_{mod}) \overline{F(\omega + (k+1)\omega_{mod})} \right] e^{-i\omega_{mod}t} +$$

$$I_0 \sum_{k=0}^{+\infty} \left[ -\overline{J_{k+1}} j_k \overline{F(\omega - (k+1)\omega_{mod})} F(\omega - k\omega_{mod}) + \right.$$

$$\left. \overline{J_k} j_{k+1} \overline{F(\omega + k\omega_{mod})} F(\omega + (k+1)\omega_{mod}) \right] e^{i\omega_{mod}t}$$

The following is written:

$$A_{k,k+1} = j_k \overline{J_{k+1}} =$$

$$\left( |a'|e^{i\phi'_o} J_k(\delta_o) + |b'|e^{i\phi'_e} J_k(\delta_e) \right)\left( |a'|e^{-i\phi'_o} J_{k+1}(\delta_o) + |b'|e^{-i\phi'_e} J_{k+1}(\delta_e) \right) =$$

-continued $$|a|^2 J_k(\delta_0) J_{k+1}(\delta_0) + |b|^2 J_k(\delta_e) J_{k+1}(\delta_e) +$$

$$|a'||b'| \left( e^{i(\phi'_e - \phi'_o)} J_k(\delta_e) J_{k+1}(\delta_0) + e^{-i(\phi'_e - \phi'_o)} J_k(\delta_0) J_{k+1}(\delta_e) \right) =$$

$$|a|^2 J_k(\delta_0) J_{k+1}(\delta_0) + |b|^2 J_k(\delta_e) J_{k+1}(\delta_e) +$$

$$|a||b| [J_k(\delta_e) J_{k+1}(\delta_0) + J_k(\delta_o) J_{k+1}(\delta_e)]\cos(\Delta\phi) -$$

$$i|a||b| [J_k(\delta_o) J_{k+1}(\delta_e) - J_k(\delta_e) J_{k+1}(\delta_0)]\sin(\Delta\phi)$$

With $\Delta\Phi = \phi'_e + \phi'_o + \phi_{a'} - \phi_{b'}$

And $b_k = A_{k,k+1} \cdot F(\omega + k\omega_{mod})\overline{F(\omega + (k+1)\omega_{mod})} -$ $$\overline{A_{k,k+1}} \cdot \overline{F(\omega - k\omega_{mod})} F(\omega - (k+1)\omega_{mod})$$

Demodulating this signal with the demodulation system using a signal of the form cos $$(\omega_{mod}t + \varphi_{dem}),$$

and then performing low-pass filtering to keep only the DC component, gives an error signal $V_{68}$ of the following form:

$$V_\epsilon = G_{tot}\langle I_{r,t} \cdot \sin(\omega_{mod}t + \varphi_{dem})\rangle, \text{ with } G_{tot} = G_{PD}.G_{mixer}.G_{filter}$$

being a term that groups together the gains of the various components, the photodiode, the signal mixer and the low-pass filter.

The general form of the error signal is (Equation 2)

$$V_\epsilon = G_{tot}I_o \cdot \sum_{k=0}^{+\infty} \text{Re}(b_k)\cos(\varphi_{dem}) + \text{Im}(b_k)\sin(\varphi_{dem})$$

The expression of the error signal $V_\epsilon 0$ derived from Equation 2 is adopted while limiting the sum to the first p terms:

$$V_\varepsilon(\Delta\Phi, v) = G_{tot}I_o \cdot \sum_{k=0}^{p} [\text{Re}(b_k)\cos(\varphi_{dem}) + \text{Im}(b_k)\sin(\varphi_{dem})]$$

$$b_k(\Delta\Phi, v) \equiv b_{k,1}(\Delta\Phi, v) = A_{k,k+1}(\Delta\Phi, v)F(v + kf_{mod})\overline{F(v + (k+1)f_{mod})} -$$

$$A_{k+1,k}(\Delta\Phi, v)F(v - (k+1)f_{mod})\overline{F(v - kf_{mod})} =$$

$$A_k(\Delta\Phi, v)F(v + kf_{mod})\overline{F(v + (k+1)f_{mod})} -$$

$$\overline{A_k(\Delta\Phi, v)}F(v - (k+1)f_{mod})\overline{F(v - kf_{mod})}$$

With $A_k(\Delta\Phi, v) \equiv A_{k,k+1}$

Hereinafter, $$G_{tot}I_o = 1$$

will be adopted in order to lighten the notations. Use is made simply of the (demonstrable) property $$F_{r,t}(v_0 - \delta v) = \overline{F_{r,t}(v_0 + \delta v)}$$

of the amplitude transmission $F_t$ or reflection $F_r$ function when $\delta v$ is the frequency difference with respect to a resonance $v_0$ of the cavity C.

$$b_k(\Delta\Phi, v_0) = A_k(\Delta\Phi, v_0) \cdot F(v_0 + k f_{mod}) \cdot \overline{F(v_0 + (k+1)f_{mod})} -$$
$$\overline{A_k}(\Delta\Phi, v_0) \cdot F(v_0 - (k+1)f_{mod}) \cdot \overline{F(v_0 - k f_{mod})}$$
$$b_k(\Delta\Phi, v_0) = A_k(\Delta\Phi, v_0) \cdot F(v_0 + k f_{mod}) \cdot F(v_0 - (k+1)f_{mod}) -$$
$$\overline{A_k}(\Delta\Phi, v_0) \cdot F(v_0 - (k+1)f_{mod}) \cdot F(v_0 + k f_{mod})$$

This then gives $$b_k(\Delta\Phi, v_0) =$$
$$(A_k(\Delta\Phi, v_0) - \overline{A_k}(\Delta\Phi, v_0)) \cdot F(v_0 + k f_{mod}) \cdot F(v_0 - (k+1)f_{mod}) =$$
$$2iIm(A_k(\Delta\Phi, v_0)) \cdot F(v_0 + k f_{mod}) \cdot F(v_0 - (k+1)f_{mod})$$

It is desirable for $V_\varepsilon$ to be zero at resonance even with RAM. It is therefore necessary to simultaneously cancel out all instances of $b_k(v)$, and therefore all instances of $Im(A_k(\Delta\Phi,v_0))$ this being possible with $$\sin(\Delta\Phi) = 0$$

(see expression of $A_k$).

It will be noted that the condition being at resonance $$(\delta v = v - v_0 = 0) \text{ with } \sin(\Delta\Phi) = 0''$$

is independent of the demodulation phase. If the coefficients $b_k(\Delta\Phi,v_0)$ are zero, the error signal $V_{249}(\Delta\Phi,v)$ is zero for any demodulation phase.

It is now necessary to prove that there are error signals that make it possible to control $\Delta\Phi$ and to lock the frequency of the laser to a resonance of the cavity. Indeed, there is no guarantee that it is not possible to have a situation in which there would be sin $$\sin(\Delta\Phi) \neq 0 \text{ and } \delta v \neq 0$$

and however have $b_k(\Delta\Phi,v)$ equal to zero, that is to say that, by bad luck, the defects in the servo control of the phase modulator would compensate for an error with locking to a resonance of the cavity. Hereinafter, it is therefore shown that being at resonance with $\sin(\Delta\Phi)=0$ is a necessary and sufficient condition to have $b_k(\Delta\Phi, v)$ equal to zero.

The purpose of the calculation disclosed below is to show that only the condition being at resonance $$(\text{difference } \delta v = 0) \text{ and } \sin(\Delta\Phi) = 0''$$

makes it possible to have $b_k(\Delta\Phi,v)$ equal to zero. It is assumed that the frequency of the laser $v_0+\delta v$ and the phase $\Delta\Phi_0+\delta\Delta\Phi$ may vary around their servo-controlled values $$\delta\Delta\Phi = 0 \text{ and } \delta v = 0,$$

that is to say $$b_k(\sin(\Delta\Phi_0) = 0, v_0) = 0$$

(see Equation 3). It is sought to ascertain whether it is possible to have, close to this situation, other pairs of values $(\Delta\Phi,\delta v)$ such that all of the coefficients $b_k=0$ are also zero.

It will be recalled that the coefficients $F_k$ depend only on the characteristics of the cavity and are independent of $\Delta\Phi$. Use will be made of the properties of symmetries around a resonant frequency $v_0$, which are valid in transmission mode and in reflection mode:

$$F_t(v_0 - \delta v) = \overline{F_t(v_0 + \delta v)} \text{ and } \frac{dF_t}{dv}(v_0 - \delta v) = -\overline{\frac{dF_t}{dv}(v_0 + \delta v)}$$

This then gives:

$$b_k(\Delta\Phi + \delta\Delta\Phi, v_0 + \delta v) = b_k(\sin(\Delta\Phi), v_0) + \delta v \left.\frac{db_k}{dv}\right|_{v_0} + \delta\Delta\Phi \frac{db_k}{d\Delta\Phi}$$

with $b_k(\Delta\Phi,v_0)$ (see Equation 3):

$$b_k(\Delta\Phi, v_0) = A_k(\Delta\Phi, v_0)F(v_0 + k f_{mod})\overline{F(v_0 + (k+1)f_{mod})} -$$
$$\overline{A_k(\Delta\Phi, v_0)}F(v_0 - (k+1)f_{mod})\overline{F(v_0 - k f_{mod})} = -2Im(A_k(\Delta\Phi, v_0))(q_k - ip_k)$$

By writing:

$$p_k + iq_k =$$
$$F(v_0 - (k+1)f_{mod})\overline{F(v_0 - k f_{mod})} = F(v_0 + k f_{mod})F(v_0 - (k+1)f_{mod})$$

This then gives:

$$\frac{db_k}{d\Delta\Phi} = \frac{dA_k(\Delta\Phi, v_0)}{d\Delta\Phi}F(v_0 + k f_{mod}) \cdot \overline{F(v_0 + (k+1)f_{mod})} -$$
$$\frac{d\overline{A_k}(\Delta\Phi, v_0)}{d\Delta\Phi}F(v_0 - (k+1)f_{mod}) \cdot \overline{F(v_0 - k f_{mod})} =$$

-continued $$\frac{dA_k(\Delta\Phi, v_0)}{d\Delta\Phi}F(v_0 + kf_{mod}) \cdot F(v_0 - (k+1)f_{mod}) -$$

$$\frac{d\overline{A_k(\Delta\Phi, v_0)}}{d\Delta\Phi}F(v_0 - (k+1)f_{mod}) \cdot F(v_0 + kf_{mod}) =$$

$$2i\text{Im}\left(\frac{dA_k(\Delta\Phi, v_0)}{d\Delta\Phi}\right)F(v_0 + kf_{mod}) \cdot F(v_0 - (k+1)f_{mod}) =$$

$$-2i|a||b|[J_k(\delta_o)J_{k+1}(\delta_e) - J_k(\delta_e)J_{k+1}(\delta_0)][p_k + iq_k]\cos(\Delta\Phi, v_0) =$$

$$2|a||b|[J_k(\delta_o)J_{k+1}(\delta_e) - J_k(\delta_e)J_{k+1}(\delta_0)][q_k - ip_k]\cos(\Delta\Phi, v_0)$$

The term $$\left.\frac{db_k}{dv}\right|_{v_0}$$

is the sum of two terms, the first, $$\left(\left.\frac{db_k}{dv}\right|_{v_0}\right)_1,$$

describing the variation in $db_k$ due to a variation in the optical frequency v via the response of the cavity, and the second, $$\left(\left.\frac{db_k}{dv}\right|_{v_0}\right)_2,$$

describing the variation in $db_k$ due to a variation in the optical frequency v via the response of the phase modulator, that is to say $$\left.\frac{db_k}{dv}\right|_{v_0} = \left(\left.\frac{db_k}{dv}\right|_{v_0}\right)_1 + \left(\left.\frac{db_k}{dv}\right|_{v_0}\right)_2$$

$$\left(\left.\frac{db_k}{dv}\right|_{v_0}\right)_1 = A_k(\Delta\Phi, v_0) \cdot \frac{d}{dv}\left(F(v_0 + kf_{mod}) \cdot \overline{F(v_0 + (k+1)f_{mod})}\right) -$$

$$\overline{A_k(\Delta\Phi, v_0)} \cdot \frac{d}{dv}\left(F(v_0 - (k+1)f_{mod}) \cdot \overline{F(v_0 - kf_{mod})}\right)$$

and $$\left(\left.\frac{db_k}{dv}\right|_{v_0}\right)_2 = \left.\frac{dA_k(\Delta\Phi, v_0)}{d\Delta\Phi}\frac{d\Delta\Phi}{dv}\right|_{v_0}F(v_0 + kf_{mod}) \cdot \overline{F(v_0 + (k+1)f_{mod})} -$$

$$\left.\frac{d\overline{A_k(\Delta\Phi, v_0)}}{d\Delta\Phi}\frac{d\Delta\Phi}{dv}\right|_{v_0}F(v_0 - (k+1)f_{mod}) \cdot \overline{F(v_0 - kf_{mod})}$$

We have $$\left(\left.\frac{db_k}{dv}\right|_{v_0}\right)_1 = A_k(\Delta\Phi)\frac{dF(v_0 + kf_{mod})}{dv}\overline{F(v_0 + (k+1)f_{mod})} +$$

$$A_k(\Delta\Phi)F(v_0 + kf_{mod})\frac{d\overline{F(v_0 + (k+1)f_{mod})}}{dv} -$$

$$\overline{A_k(\Delta\Phi)}\frac{dF(v_0 - (k+1)f_{mod})}{dv}\overline{F(v_0 - kf_{mod})} -$$

-continued $$\overline{A_k(\Delta\Phi)}F(v_0 - (k+1)f_{mod})\frac{dF(v_0 - kf_{mod})}{dv} =$$

$$A_k(\Delta\Phi)\frac{dF(v_0 + kf_{mod})}{dv}F(v_0 - (k+1)f_{mod}) -$$

$$A_k(\Delta\Phi)F(v_0 + kf_{mod})\frac{dF(v_0 - (k+1)f_{mod})}{dv} -$$

$$\overline{A_k(\Delta\Phi)}\frac{dF(v_0 - (k+1)f_{mod})}{dv}F(v_0 + kf_{mod}) +$$

$$\overline{A_k(\Delta\Phi)} \, F(v_0 - (k+1)f_{mod})\frac{dF(v_0 + kf_{mod})}{dv} =$$

$$\left[A_k(\Delta\Phi) + \overline{A_k(\Delta\Phi)}\right]\left[F(v_0 - (k+1)f_{mod})\frac{dF(v_0 + kf_{mod})}{dv} -\right.$$

$$\left.F(v_0 + kf_{mod})\frac{dF(v_0 - (k+1)f_{mod})}{dv}\right] = -$$

$$2\left(F(v_0 + kf_{mod})\frac{dF}{dv}\big|_{v_0-(k+1)f_{mod}} -\right.$$

$$\left.F(v_0 - (k+1)f_{mod})\frac{dF}{dv}\big|_{v_0+kf_{mod}}\right)Re(A_k(\Delta\Phi))$$

and $$\left(\left.\frac{db_k}{dv}\right|_{v_0}\right)_2 == \frac{dA_k(\Delta\Phi)}{d\Delta\Phi}\frac{d\Delta\Phi}{dv}F(v_0 + kf_{mod}) \cdot \overline{F(v_0 + (k+1)f_{mod})} -$$

$$\frac{d\overline{A_k(\Delta\Phi)}}{d\Delta\Phi}\frac{d\Delta\Phi}{dv}F(v_0 - (k+1)f_{mod}) \cdot \overline{F(v_0 - kf_{mod})} =$$

$$\left[\frac{dA_k(\Delta\Phi)}{d\Delta\Phi}F(v_0 + kf_{mod}) \cdot F(v_0 - (k+1)f_{mod}) -\right.$$

$$\left.\frac{d\overline{A_k(\Delta\Phi)}}{d\Delta\Phi}F(v_0 - (k+1)f_{mod}) \cdot F(v_0 + kf_{mod})\right]\frac{d\Delta\Phi}{dv} =$$

$$2i \, \text{Im}\left(\frac{dA_k(\Delta\Phi)}{d\Delta\Phi}\right)F(v_0 + kf_{mod}) \cdot F(v_0 - (k+1)f_{mod})\frac{d\Delta\Phi}{dv}$$

To obtain this result, we assumed that the depths of modulations $$\delta_{o,e} = -\frac{\pi l}{\lambda d}r_{o,e}n_{o,e}^3 V_{RF}$$

changed little with the difference $\delta v$ since $$\frac{d\delta_{o,e}}{dv} = -\frac{\pi l}{cd}r_{o,e}n_{o,e}^3 V_{RF} = \frac{\delta_{o,e}}{v},$$

and that the values of $\delta_{o,e}$ are at most a few radians. This implies that $$\frac{d\delta_{o,e}}{dv}$$

is of the order of $10^{-14}$.

This therefore gives $$\left(\frac{db_k}{dv}\Big|_{v_0}\right)_2 =$$

$$2|a||b| \; [J_{k(\delta_o)}J_k + 1(\delta_e) - J_k(\delta_e)J_{k+1}(\delta_o)] \; [q_k - i \; p_k] \; \cos(\Delta\Phi)\frac{d\Delta\Phi}{dv} =$$

$$\frac{db_k}{d\Delta\Phi} \cdot \frac{d\Delta\Phi}{dv}$$

The term $$\left(\frac{db_k}{dv}\Big|_{v_0 resonance}\right)_2$$

may be neglected in relation to $$\left(\frac{db_k}{dv}\Big|_{v_0 resonance}\right)_1$$

Indeed, $\Delta\Phi$ is close to $(2k+1)\pi/2$ and, being a phase term, it is proportional to the optical frequency $v$, that is to say $\Delta\Phi = \alpha v$ and $$\frac{d\Delta\Phi}{dv}\Big|_{\Delta\Phi_0} = \alpha = \frac{\Delta\Phi_0}{v}.$$

If it is assumed that propagation takes place over 10 m and that the birefringence is such that it entails accumulation of a phase shift of $2\pi$ every $\lambda$, then this entails accumulating, at 1.55 µm, $4\cdot10^6$ rads, i.e.

$$\frac{d\Delta\Phi}{dv}\Big|_{\Delta\Phi_0} \approx 2\cdot10^{-8},$$

while the multiplicative term $$2|a||b|[J_k(\delta_o)J_{k+1}(\delta_e) - J_k(\delta_e)J_{k+1}(\delta_0)][q_k - ip_k]$$

may be increased by taking $$|a| = |b| = 1, J_k(\delta_o)J_{k+1}(\delta_e) = J_0^2(0) = 1,$$

$$J_k(\delta_e)J_{k+1}(\delta_0) = 0, F(v_0 + kf_{mod}) \cdot F(v_0 - (k+1)f_{mod}) = 1,$$

that is to say $$2|a||b|[J_k(\delta_o)J_{k+1}(\delta_e) - J_k(\delta_e)J_{k+1}(\delta_0)]q_k - ip_k \le 2$$

This therefore gives (Equation 4):

$$db_k = \delta_v\frac{db_k}{dv} + \delta\Delta\Phi\frac{db_k}{d\Delta\Phi} =$$

$$2|a||b| \; [J_k(\delta_o)J_{k+1}(\delta_e) - J_k(\delta_e)J_{k+1}(\delta_o)] \; [q_k - i \; p_k] \; \cos(\Delta\Phi) \; \delta\Delta\Phi -$$

-continued $$2K_k \cdot Re(A_k)\cdot\delta_v$$

using $p_k + i \; q_k = F(v_0 + kf_{mod})F(v_0 - (k+1)kf_{mod})$, $$K_k = F(v_0 + kf_{mod})\frac{dF}{dv}\Big|_{v_0-(k+1)f_{mod}} - F(v_0 - (k+1)f_{mod})\frac{dF}{dv}\Big|_{v_0-(k+1)f_{mod}}$$

$$A_k(\Delta\Phi) = |a|^2J_k(\delta_o)J_{k+1}(\delta_o) + |b|^2J_k(\delta_e)J_{k+1}(\delta_e) +$$

$$|a||b| \; [J_k(\delta_e)J_{k+1}(\delta_o) + J_k(\delta_o)J_{k+1}(\delta_e)] \; \cos(\Delta\Phi) -$$

$$i \; |a||b| \; [J_k(\delta_o)J_{k+1}(\delta_e) + J_k(\delta_e)J_{k+1}(\delta_o)] \; \sin(\Delta\Phi)$$

Thereby giving (Equation 5):

$$b_k = -2Im(A_k(\Delta\Phi, v_0))(q_k - ip_k) - 2K_k \cdot Re(A_k)\cdot\delta v$$

By demodulating the error signal at a first demodulation phase $\varphi_{dem1}$ and a second demodulation phase $\varphi_{dem2}$ as in the methods of the invention, error signal 1 $V\epsilon_1$ and error signal 2 $V\epsilon_2$ are obtained, such that:

$$V_{\varepsilon1} = G_{tot}I_o \cdot \sum_{k=0}^{+\infty}[Re(b_k) \; \cos(\varphi_{demod1}) + Im(b_k) \; \sin(\varphi_{demod1})]$$

$$V_{\varepsilon2} = G_{tot}I_o \cdot \sum_{k=0}^{+\infty}[Re(b_k) \; \cos(\varphi_{demod2}) + Im(b_k) \; \sin(\varphi_{demod2})]$$

It is sought to ascertain whether it is possible to have a pair $(\delta\Delta\Phi,\delta v)$ of non-zero values leading to $$\begin{cases} V_{\epsilon_1} = \cos(\varphi_{demod1})\sum_{k=0}^{p}Re(b_k) + \sin(\varphi_{demod1})\sum_{k=0}^{p}Im(b_k) = 0 \\ V_{\epsilon_2} = \cos(\varphi_{demod2})\sum_{k=0}^{p}Re(b_k) + \sin(\varphi_{demod2})\sum_{k=0}^{p}Im(b_k) = 0 \end{cases}$$

If the demodulation phases are chosen such that the system determinant, $$det1 = \cos(\phi_{demod1})\sin(\phi_{demod2}) - \sin(\phi_{demod1})\cos(\phi_{demod2}),$$

is not zero (condition A), then the only solution is:

$$\begin{cases} \sum_{k=0}^{p}Re(b_k) = \sum_{k=0}^{p}Re(b_k(\Delta\Phi_0 + \Delta\Phi, v_0 + \delta v)) = 0 \\ \sum_{k=0}^{p}Im(b_k) = \sum_{k=0}^{p}Im(b_k(\Delta\Phi_0 + \Delta\Phi, v_0 + \delta v)) = 0 \end{cases}$$

that is to say $$\begin{cases} \sum_{k=0}^{p}Re(db_k) = 0 \\ \sum_{k=0}^{p}Im(db_k) = 0 \end{cases}$$

since $\sum_{k=0}^{p} Re(b_k(\Delta\Phi_0, v_0)) = 0$ and $\sum_{k=0}^{p} Im(b_k(\Delta\Phi_0, v_0)) = 0$.

What are therefore sought are the solutions of $$
\begin{cases}
\sum_{k=0}^{p} Re(db_k) = 2\delta\Delta\Phi \cos\ (\Delta\Phi_0)\sum_{k=0}^{p}|a||b|\ [J_k(\delta_o)J_{k+1}(\delta_e) - J_k(\delta_e)J_{k+1}(\delta_o)]\ q_k - 2\delta v\sum_{k=0}^{p}Re(A_k)Re(K_k) = 0\\
\sum_{k=0}^{p} Im(db_k) = -2\delta\Delta\Phi \cos\ (\Delta\Phi_0)\sum_{k=0}^{p}|a||b|\ [J_k(\delta_o)J_{k+1}(\delta_e) - J_k(\delta_e)J_{k+1}(\delta_o)]\ p_k - 2\delta v\sum_{k=0}^{p}Re(A_k)Im(K_k) = 0
\end{cases}
$$

The only solution of this system is ($\delta\Delta\Phi=0,\delta v=0$), since the system determinant is non-zero. It has therefore been proven that ($\delta\Delta\Phi=0,\delta v=0$) is then the only solution reached when the servo-control operations have converged.

Out of the choice of a pair of demodulation phases, the choice of two phases in quadrature guarantees that the determinant det1 is not zero, since it is equal to 1.

$$\cos(\varphi_{demod1})\ \sin(\varphi_{demod2}) - \sin(\varphi_{demod1})\ \cos(\varphi_{demod2}) =$$

$$\cos(\varphi_{demod})\ \sin(\varphi_{demod} + \pi/2) - \sin(\varphi_{demod} + \pi/2)\ \cos(\varphi_{demod}) =$$

$$\cos^2(\varphi_{demod}) + \sin^2(\varphi_{demod} + \pi/2) = 1$$

Hereinafter, the choice of two phases in quadrature will be kept, since it makes it possible to derive analytical formulas. We will show that it is possible to decorrelate the servo-control signals, in a transitional state. It is shown that it is possible to reach the condition $\delta v=0$ independently of the condition $\sin(\Delta\Phi)=0$, thereby in fact making the system insensitive to RAM. It could therefore be assumed that there is no point in eliminating RAM. The problem is that this decoupling demodulation phase may vary under the influence of variations in experimental conditions. For example, this demodulation phase may vary if the optical and electrical delays vary, for example due to temperature. It is therefore necessary to eliminate the RAM in order to overcome it. It will also be shown that it is possible to reach the condition $\sin(\Delta\Phi)=0$ independently of the condition $\delta v=0$, so that the signal applied to control the RAM does not contain any component due to the drift of the laser.

It is now sought to have one of the two error signals $V\epsilon_1$ or $V\epsilon_2$ that barely changes (ideally does not change at all) when the RAM changes around the servo-controlled value $\sin(\Delta\Phi)=0$. Thus, if the control of the RAM is shifted with respect to this ideal value, for example with a malfunction of its servo-control, in the first order this does not affect the value of this error signal, for which we will show that it may be used to lock the laser and the cavity. This error signal thus has two particular properties: close to a value such that $\sin(\Delta\Phi)=0$, it is independent of a fluctuation of the RAM, but it depends linearly on the frequency difference $\delta v$ between the laser and a resonance of the cavity.

Two demodulation phases $\varphi_{demod}$ and $\varphi_{demod}+\pi/2$ are therefore sought such that the signal used to servo-control the cavity, $V_{\epsilon1}$ or $V_{\epsilon2}$, does not depend or barely depends on a variation in the RAM, when the laser is at resonance with the cavity $$\left(v_0 = pc/L_{opt},\ \Delta\Phi = (k+1)\pi\right)$$

that is to say $$\left.\frac{dV_{\epsilon1,2}}{d\Delta\Phi}\right| = 0,$$

that is to say $$\frac{dV_{\epsilon1}}{d\Delta\Phi} = \frac{d}{d\Delta\Phi}\left(\cos(\varphi_{demod})\sum_{k=0}^{p}Re(b_k) + \sin(\varphi_{demod})\sum_{k=0}^{p}Im(b_k)\right) = 0$$

$$\text{or}\ \frac{dV_{\epsilon2}}{d\Delta\Phi} = \frac{d}{d\Delta\Phi}\left(-\sin(\phi_{demod})\sum_{k=0}^{p}Re(b_k) + \cos(\phi_{demod})\sum_{k=0}^{p}Im(b_k)\right) = 0$$

that is to say $$\cos(\varphi_{demod})\frac{d}{d\Delta\Phi}\left(\sum_{k=0}^{p}Re(b_k)\right) + \sin(\varphi_{demod})\frac{d}{d\Delta\Phi}\left(\sum_{k=0}^{p}Im(b_k)\right) = 0 \qquad (C)$$

$$\text{or}\ -\sin(\varphi_{demod})\frac{d}{d\Delta\Phi}\left(\sum_{k=0}^{p}Re(b_k)\right) + \cos(\varphi_{demod})\frac{d}{d\Delta\Phi}\left(\sum_{k=0}^{p}Im(b_k)\right) = 0 \qquad (D)$$

Since (see Equation 5)

$$b_k(\sin(\Delta\Phi_0) = 0 + \delta\Delta\Phi,\ v_0\ \text{resonance}) = -2|a||b|[J_k(\delta_o)J_{k+1}(\delta_e) -$$

$$J_k(\delta_e)J_{k+1}(\delta_0)]F(v_0 + kf_{mod})F(v_0 - (k+1)f_{mod})\delta\Delta\Phi i$$

equation (C) leads to (since the coefficients $$J_k(\delta_o),\ J_{k+1}(\delta_e),\ J_k(\delta_e),\ J_{k+1}(\delta_0)$$

are real)

$$\cos(\varphi_{demod})Im\left(\sum_{k=0}^{p}[J_k(\delta_o)J_{k+1}(\delta_e) -\right.$$

$$\left. J_k(\delta_e)J_{k+1}(\delta_0)]F(v_0 + kf_{mod})F(v_0 - (k+1)f_{mod})\right) =$$

$$\sin(\varphi_{demod})Re\left(\sum_{k=0}^{p}[J_k(\delta_o)J_{k+1}(\delta_e) -\right.$$

$$\left. J_k(\delta_e)J_{k+1}(\delta_0)]F(v_0 + kf_{mod})F(v_0 - (k+1)f_{mod})\right)$$

35

The desired demodulation phase is therefore given by $$\varphi_{demod1} = \arg\left(\sum_{k=0}^{P}[J_k(\delta_o)J_{k+1}(\delta_e) - \right.$$

$$\left. J_k(\delta_e)J_{k+1}(\delta_0)]F(v_0 + kf_{mod})F(v_0 - (k+1)f_{mod})\right) + p\pi$$

Equation (D) leads to $$-\sin(\varphi_{demod})\mathrm{Im}\left(\sum_{k=0}^{p}[J_k(\delta_o)J_{k+1}(\delta_e) - \right.$$

$$\left. J_k(\delta_e)J_{k+1}(\delta_0)]F(v_0 + kf_{mod})F(v_0 - (k+1)f_{mod})\right) =$$

$$\cos(\varphi_{demod})\mathrm{Re}\left(\sum_{k=0}^{p}[J_k(\delta_o)J_{k+1}(\delta_e) - \right.$$

$$\left. J_k(\delta_e)J_{k+1}(\delta_0)]F(v_0 + kf_{mod})F(v_0 - (k+1)f_{mod})\right)$$

The desired demodulation phase is therefore given by $$\tan(\varphi_{demod}) = -\frac{\mathrm{Re}(\Sigma_{k=0}^{p}[J_k(\delta_o)J_{k+1}(\delta_e) - J_k(\delta_e)J_{k+1}(\delta_0)]}{F(v_0 + kf_{mod})F(v_0 - (k+1)f_{mod}))}{\mathrm{Im}(\Sigma_{k=0}^{p}[J_k(\delta_o)J_{k+1}(\delta_e) - J_k(\delta_e)J_{k+1}(\delta_0)]}{F(v_0 + kf_{mod})F(v_0 - (k+1)f_{mod}))}$$

that is to say $$\varphi_{demod2} = \arg\left(\sum_{k=0}^{P}[J_k(\delta_o)J_{k+1}(\delta_e) - \right.$$

$$\left. J_k(\delta_e)J_{k+1}(\delta_0)]F(v_0 + kf_{mod})F(v_0 - (k+1)f_{mod})\right) + \frac{\pi}{2} + p\pi = \varphi_{demod1} + \frac{\pi}{2}$$

It may be seen that this demodulation phase depends only on the modulation depth and on the transfer function of the cavity. This demodulation phase corresponds to the additional phase $\phi_{dec2}$ mentioned above, and which is such that the SP function no longer depends on the RAM.

It is now verified that it is possible to use one of the two error signals in order to lock the laser and the cavity. It will be recalled that the error signals that are used are (forgetting the term $G_{tot}I_o$):

$$V_{\varepsilon1} \equiv \sum_{k=0}^{+\infty}[\mathrm{Re}(db_k)\cos(\varphi_{demod}) + \mathrm{Im}(db_k)\sin(\varphi_{demod})]$$

with a demodulation phase $$\cos(\varphi_{demod})\frac{d}{d\Delta\Phi}\left(\sum_{k=0}^{p}\mathrm{Re}(b_k)\right) + \sin(\varphi_{demod})\frac{d}{d\Delta\Phi}\left(\sum_{k=0}^{p}\mathrm{Im}(b_k)\right) = 0$$

36

-continued $$\text{and } V_{\varepsilon2} \equiv \sum_{k=0}^{+\infty}[\mathrm{Re}(db_k)\cos(\varphi_{demod} + \pi/2) + \mathrm{Im}(db_k)\sin(\varphi_{demod} + \pi/2)]$$

with a demodulation phase $$-\sin(\varphi_{demod})\frac{d}{d\Delta\Phi}\left(\sum_{k=0}^{p}\mathrm{Re}(b_k)\right) + \cos(\varphi_{demod})\frac{d}{d\Delta\Phi}\left(\sum_{k=0}^{p}\mathrm{Im}(b_k)\right) = 0$$

with the expression of $b_k$ presented in Equation 5, and (see above)

$$A_k = |a|^2 J_k(\delta_0)J_{k+1}(\delta_0) + |b|^2 J_k(\delta_e)J_{k+1}(\delta_e) +$$

$$|a||b|[J_k(\delta_e)J_{k+1}(\delta_0) + J_k(\delta_o)J_{k+1}(\delta_e)]\cos(\Delta\Phi) -$$

$$i|a||b|[J_k(\delta_o)J_{k+1}(\delta_e) - J_k(\delta_e)J_{k+1}(\delta_0)]\sin(\Delta\Phi)$$

and with (see Equation 4):

$$db_k = \delta v\frac{db_k}{dv} + \delta\Delta\Phi\frac{db_k}{d\Delta\Phi} =$$

$$2|a||b|[J_k(\delta_o)J_{k+1}(\delta_e) - J_k(\delta_e)J_{k+1}(\delta_0)][q_k - ip_k]\cos(\Delta\Phi)\delta\Delta\Phi -$$

$$2K_k \cdot \mathrm{Re}(A_k) \cdot \delta v$$

that is to say $$V_{\varepsilon1} = 2|a||b|\delta\Delta\Phi\sum_{k=0}^{p}(q_k\cos(\varphi_{demod}) -$$

$$\sin(\varphi_{demod})p_k)(J_k(\delta_o)J_{k+1}(\delta_e) - J_k(\delta_e)J_{k+1}(\delta_0)) -$$

$$2\delta v\left[\cos(\varphi_{demod})\sum_{k=0}^{p}\mathrm{Re}(K_k)\cdot\mathrm{Re}(A_k) + \sin(\varphi_{demod})\sum_{k=0}^{p}\mathrm{Im}(K_k)\cdot\mathrm{Re}(A_k)\right]$$

Since the demodulation phase is chosen so as to cancel out the first term, there is indeed a linear error signal that makes it possible to servo-control $\delta v$ to zero and that is independent of $\Delta\Phi$. Likewise $$V_{\varepsilon2} = -2|a||b|\delta\Delta\Phi\sum_{k=0}^{p}(q_k\sin(\varphi_{demod}) +$$

$$p_k\cos(\varphi_{demod}))(J_k(\delta_o)J_{k+1}(\delta_e) - J_k(\delta_e)J_{k+1}(\delta_0)) -$$

$$2\delta v\left[-\sin(\varphi_{demod})\sum_{k=0}^{p}\mathrm{Re}(K_k)\cdot\mathrm{Re}(A_k) + \cos(\varphi_{demod})\sum_{k=0}^{p}\mathrm{Im}(K_k)\cdot\mathrm{Re}(A_k)\right]$$

It may be seen that there are therefore two decoupling phases in phase quadrature to one another such that, at the decoupling phase and at the zero difference, the level of the plateau of the PL function is canceled out when the RAM is zero. It is thus verified that $(\delta\Delta\Phi=0,\delta v=0)$ is the only solution reached when the servo-control operations have converged. The PL function is in fact zero for any value of $\Delta\Phi$, whereas it is linear as a function of $\delta v$ and may be used to lock the laser and the cavity.

In reflection mode, we have $$\varphi_{demod1} = \arg\left(\sum_{k=0}^{p}[J_k(\delta_o)J_{k+1}(\delta_e) - \right.$$

$$\left. J_k(\delta_e)J_{k+1}(\delta_0)]F(v_0 + kf_{mod})F(v_0 - (k+1)f_{mod})\right) + p\pi$$

Since the sidebands are clearly outside the resonance of the cavity, they are almost totally reflected, and this gives either $$F(v_0 + kf_{mod}) \approx -F(v_0 - (k+1)f_{mod})$$

$$\text{or } \varphi_{demod1} \approx -\arg\left(\sum_{k=0}^{p}[J_k(\delta_o)J_{k+1}(\delta_e) - J_k(\delta_e)J_{k+1}(\delta_0)]\right) = 0$$

$$\text{Since } p_k + iq_k = F(v_0 + kf_{mod})F(v_0 - (k+1)f_{mod}) \approx -1 + 0i$$

$$\text{then } V_{\varepsilon 1} \approx 2|a||b|\delta\Delta\Phi\sin(0)\Sigma_{k=0}^{p}J_k(\delta_o)J_{k+1}(\delta_e) - J_k(\delta_e)J_{k+1}(\delta_0) \approx 0$$

$$\text{Likewise, } \varphi_{demod2} = \varphi_{demod} + \frac{\pi}{2},$$

$$V_{\varepsilon 2} \approx 2|a||b|\delta\Delta\Phi\cos(\varphi_{demod})\sum_{k=0}^{p}(J_k(\delta_o)J_{k+1}(\delta_e) - J_k(\delta_e)J_{k+1}(\delta_0)) \approx$$

$$2|a||b|\delta\Delta\Phi\cos\left(\frac{\pi}{2}\right)\sum_{k=0}^{p}J_k(\delta_o)J_{k+1}(\delta_e) - J_k(\delta_e)J_{k+1}(\delta_0) \approx 0$$

In reflection mode, decoupling exists, but it leads to a zero slope or in any case a very small slope for the error signals. In order to compensate for this small slope, preferably in reflection mode, in step B iv), the modulation frequency $f_{mod}$ is demodulated at 3×.

It is then sought to have one of the two error signals $V\epsilon_1$ or $V\epsilon_2$ that barely changes (ideally does not change at all) when the laser frequency changes around the resonance. Thus, if the laser is shifted with respect to resonance, for example with a malfunction of its servo control, in the first order this does not affect the value of this error signal, for which we will show that it may be used to servo-control $\sin(\Delta\Phi)$. This error signal thus has two particular properties: close to resonance, it is independent of the laser frequency, but it depends linearly on the phase $\Delta\Phi$).

What is thus sought is a demodulation phase such that a plateau, defined by a portion of value P of the difference on which the error signal barely changes (ideally does not change at all, that is to say tangent to the horizontal curve) when the laser frequency changes, exists around a resonance for one of the two error signals $V\epsilon_x$ or $V\epsilon_y$.

What are therefore sought are two demodulation phases $\varphi_{dem1}$ and $\varphi_{dem,2} = \varphi_{dem1} + \pi/2$ such that, on a portion P with a difference value close to 0

$$\frac{d}{dv}\left(\cos(\varphi_{dem})\sum_{k=0}^{p}\text{Re}(b_k) + \sin(\varphi_{dem})\sum_{k=0}^{p}\text{Im}(b_k)\right) = 0$$

$$\text{or } \frac{d}{dv}\left(-\sin(\varphi_{dem})\sum_{k=0}^{p}\text{Re}(b_k) + \cos(\varphi_{dem})\sum_{k=0}^{p}\text{Im}(b_k)\right) = 0$$

That is to say $$\cos(\varphi_{dem})\frac{d}{dv}\left(\sum_{k=0}^{p}\text{Re}(b_k)\right) + \sin(\varphi_{dem})\frac{d}{dv}\left(\sum_{k=0}^{p}\text{Im}(b_k)\right) = 0 \quad (A)$$

$$\text{or } -\sin(\varphi_{dem})\frac{d}{dv}\left(\sum_{k=0}^{p}\text{Re}(b_k)\right) + \cos(\varphi_{dem})\frac{d}{dv}\left(\sum_{k=0}^{p}\text{Im}(b_k)\right) = \quad (B)$$

Using the expression of $b_k$ presented in Equation 5 and as presented above, $$K_k = F(v_0 + kf_{mod})\frac{dF}{dv}\bigg|_{v_0-(k+1)f_{mod}} - F(v_0 - (k+1)f_{mod})\frac{dF}{dv}\bigg|_{v_0+kf_{mod}}$$

the previous equation (A) is written:

$$\sin(\varphi_{dem})\text{Re}\left(\sum_{k=0}^{p}\text{Re}(A_k)K_k\right) + \cos(\varphi_{dem})\text{Im}\left(\sum_{k=0}^{p}\text{Re}(A_k)K_k\right) = 0$$

$$\tan(\varphi_{dem}) = -\tan\left(\sum_{k=0}^{p}\text{Re}(A_k)K_k\right)$$

$$\varphi_{dem3} = \arg\left(\sum_{k=0}^{p}\text{Re}(A_k)K_k\right) + \frac{\pi}{2} + p\pi$$

Similarly, equation B leads to a demodulation phase that makes it possible to obtain the decoupling given by:

$$\tan(\phi_{dem}) = \tan\left(\sum_{k=0}^{p}\text{Re}(A_k)K_k\right)$$

That is to say, $$\varphi_{dem4} = \arg\left(\sum_{k=0}^{p}\text{Re}(A_k)K_k\right) + p\pi = \varphi_{dem3} - \frac{\pi}{2}$$

It may be seen that there are therefore two decoupling phases in quadrature with one another (see FIGS. 5A, 5B and 6A, 6B). The PL function represents the evolution of the error signal having a plateau as a function of $\delta v$, which is used to servo-control the RAM.

It is now verified that it is possible to use the error signal giving the PL function having a plateau in order to servo-control the phase $\Delta\Phi$ via the DC voltage $V_{dc,PM}$ applied to the phase modulator.

It will be recalled that the signals that are used are:

$$V_{\varepsilon 1} \equiv \sum_{k=0}^{+\infty}[\text{Re}(b_k)\cos(\varphi_{demod}) + \text{Im}(b_k)\sin(\varphi_{demod})]$$

With a decoupling phase $$\cos(\varphi_{dem})\left(\sum_{k=0}^{p}\text{Re}(A_k)\text{Re}(K_k)\right) + \sin(\varphi_{dem})\left(\sum_{k=0}^{p}\text{Re}(A_k)\text{Im}(K_k)\right) = 0$$

$$\text{Or } V_{\varepsilon 2} \equiv \sum_{k=0}^{+\infty}[\text{Re}(b_k)\cos(\varphi_{dem} + \pi/2) + \text{Im}(b_k)\sin(\varphi_{dem} + \pi/2)]$$

With a demodulation phase $$-\sin(\varphi_{demod})\left(\sum_{k=0}^{p}\mathrm{Re}(A_k)\mathrm{Re}(K_k)\right) + \cos(\varphi_{demod})\left(\sum_{k=0}^{p}\mathrm{Re}(A_k)\mathrm{Im}(K_k)\right) = 0$$

With the expression of $b_k$ presented in Equation 5, and (see above)

$$A_k = |a|^2 J_k(\delta_0)J_{k+1}(\delta_0) + |b|^2 J_k(\delta_e)J_{k+1}(\delta_e) +$$
$$|a||b|[J_k(\delta_o)J_{k+1}(\delta_0) + J_k(\delta_o)J_{k+1}(\delta_e)]\cos(\Delta\Phi) -$$
$$i|a||b|[J_k(\delta_o)J_{k+1}(\delta_e) - J_k(\delta_e)J_{k+1}(\delta_0)]\sin(\Delta\Phi)$$

And with (see Equation 4):

$$db_k = \delta v \frac{db_k}{dv} + \delta\Delta\Phi \frac{db_k}{d\Delta\Phi} =$$
$$2|a||b|[J_k(\delta_o)J_{k+1}(\delta_e) - J_k(\delta_e)J_{k+1}(\delta_0)][q_k - ip_k]\cos(\Delta\Phi)\delta\Delta\Phi -$$
$$2K_k \cdot \mathrm{Re}(A_k) \cdot \delta v$$

We have:

$$V_{\varepsilon_1} = 2|a||b|\delta\Delta\Phi \sum_{k=0}^{p}(q_q\cos(\varphi_{dem}) -$$
$$\sin(\varphi_{dem})p_k)(J_k(\delta_o)J_{k+1}(\delta_e) - J_k(\delta_e)J_{k+1}(\delta_0)) -$$
$$2\delta v\left[\cos(\varphi_{dem})\sum_{k=0}^{p}\mathrm{Re}(K_k)\cdot\mathrm{Re}(A_k) + \sin(\varphi_{dem})\sum_{k=0}^{p}\mathrm{Im}(K_k)\cdot\mathrm{Re}(A_k)\right]$$

Now, the decoupling phase makes it possible precisely to cancel out the second term. As desired, this therefore indeed gives a linear error signal that makes it possible to servo-control M to zero and that is independent of $\delta v$.

Figure 12A:
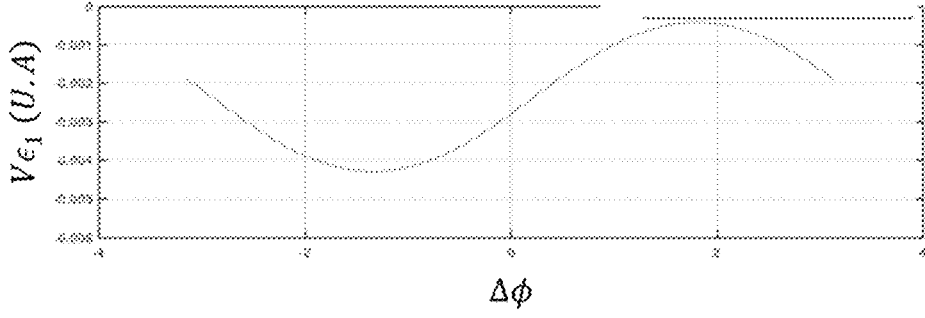
Figure 12B:
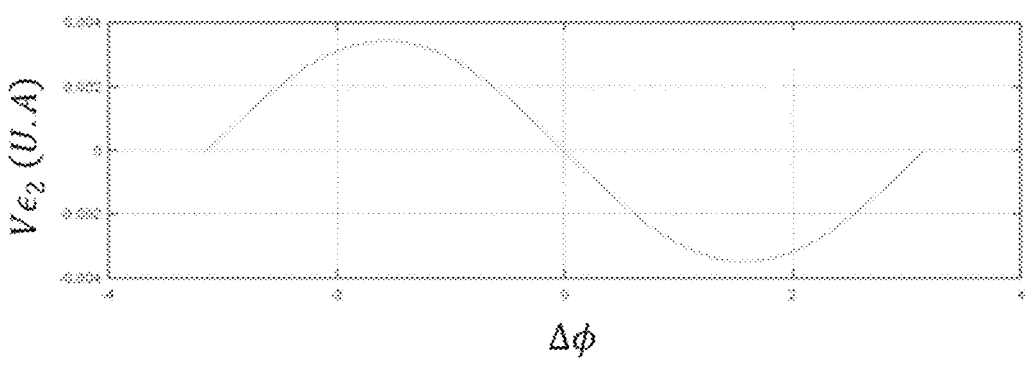

FIGS. 12A and 12B show, respectively, the change in $$V_{\varepsilon_1} = \sum_{k=0}^{p}\mathrm{Re}(b_k)\cos(\varphi_{dem}) + \mathrm{Im}(b_k)\sin(\varphi_{dem})$$

and in $$V_{\varepsilon_2} = \sum_{k=0}^{p} -\mathrm{Re}(b_k)\sin(\varphi_{dem}) + \mathrm{Im}(b_k)\cos(\varphi_{dem})$$

as a function of $\Delta\phi$. These changes were obtained with the same cavity parameters as those used for FIGS. 5A to 6B. Here, the modulation frequency is $f_{mod}=0.4$ MHz and $\delta v=80$ kHz and transmission-mode operation, that is to say the case in which the canceling out of the RAM and the servo-control are carried out with the photodiode PDt. It may be seen that, despite a difference at the resonance of 80 kHz, the error signal $V_{\varepsilon_y}$ is canceled out for $\Delta\Phi=0$ and remains linear around it, thereby making it possible to ensure servo control that cancels out the RAM. It should be noted that, if the other decoupling phase had been used, it would be the error signal that would be canceled out for $\Delta\Phi=0$ and that would make it possible to carry out the servo control.

In reflection mode, the benefit is limited because, with the sidebands being almost reflected, this gives $$\left.\frac{dF}{dv}\right|_{v_0-(k+1)f_{mod}} \approx \left.\frac{dF}{dv}\right|_{v_0+kf_{mod}} \approx 0$$

and $F(v_0 + kf_{mod}) \approx -F(v_0 - (k+1)f_{mod})$ that is to say $K_k = F(v_0 + kf_{mod})\left.\frac{dF}{dv}\right|_{v_0-(k+1)f_{mod}} -$ $$F(v_0 - (k+1)f_{mod})\left.\frac{dF}{dv}\right|_{v_0+kf_{mod}} \approx 0,$$

therefore $\varphi_{dem3} = \arg(\Sigma_{k=0}^{p}\mathrm{Re}(A_k)K_k) + \frac{\pi}{2} + p\pi \approx \frac{\pi}{2}$ and $\varphi_{dem4} \approx 0$ Since the sidebands are clearly outside the resonance of the cavity, they are almost totally reflected, and this gives $$p_k + iq_k = F(v_0 + kf_{mod})F(v_0 - (k+1)f_{mod}) \approx -1 + 0i,\text{ then}$$

$$V_{\varepsilon_1} = 2|a||b|\delta\Delta\Phi\cos\left(\frac{\pi}{2}\right)\sum_{k=0}^{p}q_k(J_k(\delta_o)J_{k+1}(\delta_e) - J_k(\delta_e)J_{k+1}(\delta_0)) = 0$$

Likewise, $$V_{\varepsilon_2} = 0.$$

In reflection mode, decoupling exists, but it leads to a zero slope or in any case a very small slope for the error signals. In order to compensate for this small slope, preferably in reflection mode, in step B iv), the modulation frequency $f_{mod}$ is demodulated at 3×.

Thus, by using one of the two demodulation phases $\varphi_{dem1}$ ou $\varphi_{dem2}$, and another demodulation phase $\varphi_{dem3}$ or $\varphi_{dem4}$, it is possible to independently servo-control $$\sin(\Delta\Phi) = 0 \text{ and } \delta v = 0.$$

It is then certain that the system converges a. toward sin $$\sin(\Delta\Phi) = 0$$

(the RAM is zero) by servo-controlling the DC offset of the phase modulator using an error signal that varies linearly around the point $\Delta\Phi=p\pi$ and does not contain any component coming from a (small) drift of the laser with respect to the cavity b. and $\delta v=0$ using an error signal to servo-control the frequency of the laser that will not contain any component coming from the RAM and that varies linearly around the point ($\delta v=0$).

Moreover, if in-phase and quadrature demodulation are carried out, then the error signals are proportional to $$V_{\varepsilon_x} = \sum_{k=0}^{p} \mathrm{Re}(A_k)\mathrm{Re}(K_k) \text{ and } V_{\varepsilon_y} = \sum_{k=0}^{p} \mathrm{Re}(A_k)\mathrm{Im}(K_k).$$

It may be shown that there is a modulation frequency $f_{mod}$ such that:

$$\sum_{k=0}^{p} \mathrm{Re}(A_k)\mathrm{Re}(K_k) = 0 \text{ or } \sum_{k=0}^{p} \mathrm{Re}(A_k)\mathrm{Im}(K_k) = 0.$$

FIGS. 13A and 13B show a change in $$V_{\varepsilon_x} = \sum_{k=0}^{p} \mathrm{Re}(A_k)\mathrm{Re}(K_k) \text{ and } V_{\varepsilon_y} = \sum_{k=0}^{p} \mathrm{Re}(A_k)\mathrm{Im}(K_k)$$

as a function of $f_{mod}$/ISL. These changes were obtained with the same cavity parameters as those used for FIGS. 5A to 6B, in transmission mode. In FIG. 14A, it is noted that the condition $$V_{\varepsilon_x} = \sum_{k=0}^{p} \mathrm{Re}(A_k)\mathrm{Re}(K_k) = 0$$

may be reached for $f_{mod}$=0.0313102 ISL. It may also be seen in FIG. 14B that $$V_{\varepsilon_y} = \sum_{k=0}^{p} \mathrm{Re}(A_k)\mathrm{Im}(K_k) = 0,$$

which is the slope of the error signal for servo-controlling the optical frequency of the laser to the cavity—or vice versa—(see Equation 4), passes through a maximum at this value of $f_{mod}$. Thus, for the modulation frequency that cancels out one of the error signals, the other error signal has a maximum slope.

The invention claimed is:

1. A method for the servo control of an optical device comprising a cavity (C) exhibiting resonance around a center frequency $f_c$, a laser (L) and a phase modulator (PM), said method being designed to servo-control said cavity (C) to said laser (L) or vice versa and to compensate for an amplitude modulation introduced by said phase modulator (PM), said method comprising the following steps:

A. using said laser (L) to generate laser radiation (LL) at an optical frequency $f$ within said resonance, B. varying a difference δv between said optical frequency of said laser radiation and said center frequency, such that said optical frequency scans said resonance, said difference being controlled by a parameter of an element of said device, and for each difference $δv_i$ i. modulating, at a modulation frequency $f_{mod}$, a phase of said laser radiation, through a modulation phase $φ_{mod}$, with the phase modulator (PM), ii. injecting the phase-modulated radiation into said cavity (C), iii. using a photodiode (PD$_t$, PD$_r$) to detect radiation reflected or transmitted by said cavity and generating an electrical signal (St, Sr) representative of the intensity of said detected radiation, iv. demodulating said electrical signal at said modulation frequency $f_{mod}$ by synchronously generating a first demodulated signal and a second demodulated signal representative of the demodulated electrical signal, respectively at a first demodulation phase $φ_{dem,1}$ and at a second modulation phase $$φ_{dem,2}φ_{dem,2} \approx φ_{dem,1} \pm k, \text{ where } k \in [0; 2\pi]$$

is different from said first phase, and by filtering the first and the second signal so as to retain only a DC component of the first demodulated signal V$ε_1$, called error signal 1, and of the second demodulated signal V$ε_2$, called error signal 2, C. computing a function 1 $f_2$ and a function 2 $f_2$ respectively representing a change in the error signal 1 and a change in the error signal 2 as a function of said difference for a given value of said first demodulation phase, D. repeating steps B) and C) by varying said first demodulation phase between each repetition until, for a value of the first demodulation phase, called decoupling phase $$φ_{dem,1} = φ_{dec},$$

said function 1 or said function 2 has a plateau on a portion of values of said difference comprising 0, said function out of 1 or 2 having the plateau being called PL function, the function not having the plateau being called SP function;

E. at said decoupling phase, varying said difference so as to observe an extremum, for what is called a zero difference, said intensity of the light radiation detected by said photodiode, and servo-controlling said element to a value of said parameter that makes it possible to maintain this intensity extremum, F. at said decoupling phase, modulating the phase of said laser radiation, with the phase modulator (PM), using what is called an additional periodic signal at what is called an additional modulation frequency $f_{add}$ in addition to that at said modulation frequency $f_{mod}$;

G. minimizing, for the SP function, an amplitude of a first harmonic of the additional signal, by varying said first demodulation phase, this minimum being reached for what is called a first additional demolition phrase $$φ_{dem,1} = φ_{dec2},$$

and, at said additional phase, servo-controlling said element to a value of said parameter that makes it possible to maintain this intensity extremum, H. at said decoupling phase $$φ_{dem,1} = φ_{dec}$$

and at said zero difference, varying said first modulation phase until the PL function is canceled out, and maintaining the canceling out of said PL function by servo-controlling said phase modulator.

2. The method as claimed in claim 1, wherein step H) consists in varying a voltage $V_{dc,pm}$ of said phase modulator up to what is called a RAM voltage value that makes it possible to cancel out the PL function and servo-controlling said phase modulator to said RAM voltage.

3. The method as claimed in claim 1, wherein, in step iii), said photodiode detects the radiation transmitted by said cavity, said method comprising a step D1), after step D) and before step E), consisting in varying said modulation frequency until a slope of said SP function is at a maximum on said portion of values, by repeating step D for each modulation frequency.

4. The method as claimed in claim 1, wherein the additional frequency $f_{add}$ is 10 times lower than the modulation frequency $f_{mod}$.

5. An optical device (D) comprising a cavity (C) exhibiting resonance around a center frequency $f_c$ and a laser (L) designed to generate laser radiation (LL) at an optical frequency $f$ within said resonance, said device comprising:

an element designed to vary a difference &v between said optical frequency of said laser radiation and said center frequency, such that said optical frequency scans said resonance, said difference being controlled by a parameter of said element, a phase modulator (PM) configured to modulate, at a modulation frequency $f_{mod}$, a phase of said laser radiation, through a modulation phase $\varphi_{mod}$, and designed to vary said modulation phase, the phase-modulated radiation being injected into said cavity (C), a photodiode (PDt, PDr) designed to detect radiation transmitted or reflected by said cavity (C) and configured to generate an electrical signal representative of the intensity of said detected radiation, a demodulation system (Dem) designed to demodulate said electrical signal at said modulation frequency $f_{mod}$, for each difference $\delta v_i$, by:

synchronously generating a first demodulated signal and a second demodulated signal representative of the demodulated electrical signal, respectively at a first demodulation phase $\varphi_{dem,1}$ and at a second modulation phase $\varphi_{dem,2}$ different from said first demodulation phase, such that $$\phi_{dec,2} \approx \phi_{dem,1} \pm k, \text{ with } k \in [0; 2\pi],$$

filtering the first and the second signal so as to retain only a DC component of the first demodulated signal, called error signal 1 $V\epsilon_1$, and of the second demodulated signal, called error signal 2 $V\epsilon_2$, a processor (UT) connected to the modulation system and designed to:

compute a function 1 and a function 2 respectively representing a change in the error signal 1 and a change in the error signal 2 as a function of said difference $\delta v$ for a given value of said first demodulation phase, determine a value of the first demodulation phase, called decoupling phase $$\phi_{dem,1} = \phi_{dec},$$

for which said function 1 or said function 2 has a plateau on a portion of values of said difference comprising 0, said function out of X or Y having the plateau being called PL function, the function not having the plateau being called SP function, determine, at said decoupling phase, a difference, called zero difference, for which said intensity of the light radiation detected by said photodiode reaches an extremum, and servo-control said element (E) to a value of said parameter that makes it possible to maintain this intensity extremum, modulate, at said decoupling phase, the phase of said laser radiation, with the phase modulator (PM), using what is called an additional periodic signal at what is called an additional modulation frequency $f_{add}$ in addition to that at said modulation frequency $f_{mod}$;

minimize, for the SP function, an amplitude of a first harmonic of the additional signal, by varying said second demodulation phase, this minimum being reached for what is called a second additional demodulation phase, and servo-control said element to a value of said parameter that makes it possible to maintain this intensity extremum at said additional phase, determine, at said decoupling phase and at said zero difference, a value of said modulation phase for which said PL function is canceled out, and servo-control said phase modulator (PM) in order to maintain the canceling out of said PL function.

6. The device as claimed in claim 5, wherein said element is said laser (L) and said parameter is a DC voltage $V_{dc,L}$ supplied to the laser.

7. The device as claimed in claim 5, wherein the element is an acousto-optic modulator (AOM) configured to vary said optical frequency of the laser radiation before it is phase-modulated by said phase modulator, said parameter being an excitation frequency $f_{AOM}$ of said acousto-optic modulator.

8. The device as claimed in claim 5, wherein the element is a piezoelectric translation stage to which a component of said cavity is fixed, said stage being designed to vary a length of the cavity, said parameter being said length of the cavity.

9. The device as claimed in claim 5, wherein the cavity (C) is a ring cavity comprising an optical fiber (FO) and first and second coupling means (M1, M2) configured to couple said radiation injected into said cavity with said optical fiber, the first and second coupling means comprising a mirror or a fiber coupler.

10. The device as claimed in claim 9, comprising:

an optical splitter (LS) designed to split the laser radiation into a first and a second optical channel (F, F') so as to inject said laser radiation into the cavity in a first and a second direction, the first optical channel comprises the phase modulator (PM) and an optical circulator (CO) positioned after the phase modulator, the second optical channel comprises an additional phase modulator (PM'), and an additional optical circulator (CO') positioned after the additional phase modulator, said optical circulator (CO) and said additional optical circulator being designed to direct the laser radiation injected respectively in said second direction and in said first direction and then reflected by the cavity (C) toward an additional reflection photodiode (PDr') and toward said photodiode (PDr), a first optical path of said first optical channel and a second optical path of said second optical channel between the phase modulator and said cavity, and the additional phase modulator and said cavity, respectively, having a guided-optic configuration.

* * * * *